(12) United States Patent
Nishimoto et al.

(10) Patent No.: US 11,421,782 B2
(45) Date of Patent: Aug. 23, 2022

(54) DRUM-TYPE TRANSMISSION DEVICE

(71) Applicant: Kanzaki Kokyukoki Manufacturing Co., Ltd., Amagasaki (JP)

(72) Inventors: Shuji Nishimoto, Amagasaki (JP); Keisei Shimazaki, Amagasaki (JP); Michio Tsukamoto, Amagasaki (JP)

(73) Assignee: KANZAKI KOKYUKOKI MANUFACTURING CO., LTD., Amagasaki (JP)

( * ) Notice: Subject to any disclaimer, the term of this patent is extended or adjusted under 35 U.S.C. 154(b) by 179 days.

(21) Appl. No.: 16/846,540

(22) Filed: Apr. 13, 2020

(65) Prior Publication Data

US 2020/0325987 A1 Oct. 15, 2020

(30) Foreign Application Priority Data

Apr. 12, 2019 (JP) .............................. JP2019-076594
Apr. 12, 2019 (JP) .............................. JP2019-076595

(51) Int. Cl.
*F16H 63/34* (2006.01)
*B60T 1/00* (2006.01)
(Continued)

(52) U.S. Cl.
CPC .......... *F16H 63/3475* (2013.01); *B60T 1/005* (2013.01); *F16H 61/32* (2013.01);
(Continued)

(58) Field of Classification Search
CPC .. F16H 63/3425; F16H 63/18; F16H 63/3433; F16H 63/3475; F16H 63/345;
(Continued)

(56) References Cited

U.S. PATENT DOCUMENTS 7,669,686 B1 * 3/2010 Einboeck ................ B60T 1/062
180/292
9,777,836 B1 * 10/2017 Lee ...................... F16H 63/3433
(Continued)

FOREIGN PATENT DOCUMENTS

JP 5909400 A 10/2013
JP 2018158619 A 1/2018

*Primary Examiner* — Ernesto A Suarez
*Assistant Examiner* — Lori Wu
(74) *Attorney, Agent, or Firm* — Cantor Colburn LLP

(57) ABSTRACT

A parking lock mechanism of the drum-type transmission device comprises a parking gear that is provided on the transmission shaft, a parking operation arm which is selectively operated between a lock position engaging with the parking gear and an unlock position away from the parking gear, a parking release spring for urging the operation arm toward the unlock position, and a parking pushing member which is positioned at a lock position by pushing the operation arm according to the rotation of the drum member from the shift position or the neutral position to the parking position. One end of the transmission operation shaft is located near the operation arm. At one end of the shift operation shaft, there is provided an arm restraining portion that can urge the operation arm toward the unlock position when the drum member is moved from the parking position to the shift position or the neutral position.

12 Claims, 12 Drawing Sheets

(51) Int. Cl.
*F16H 61/32* (2006.01)
*B60K 17/344* (2006.01)
(52) U.S. Cl.
CPC ........ *F16H 63/3425* (2013.01); *B60K 17/344* (2013.01); *F16H 2061/326* (2013.01)
(58) Field of Classification Search
CPC .. F16H 63/3466; F16H 63/3491; F16H 61/32; F16H 2061/326; B60T 1/005; B60T 1/062
See application file for complete search history.

(56) References Cited

U.S. PATENT DOCUMENTS

2004/0209718 A1* 10/2004 Ishibashi ........... B60W 30/1888
474/18
2018/0238447 A1* 8/2018 Lee .................... F16H 63/3433

* cited by examiner

DRUM-TYPE TRANSMISSION DEVICE

CROSS-REFERENCE OF RELATED APPLICATIONS

The present invention claims priority under 35 U.S.C. § 119 to Japanese Patent Application No. 2019-76594 and Japanese Patent Application No. 2019-76595 both filed on Apr. 12, 2019, each of which is hereby incorporated by reference in its entirety.

BACKGROUND OF THE INVENTION

The present invention relates to a drum-type transmission device.

A drum-type transmission device has been proposed as a transmission device used for a travelling system transmission path in a working vehicle such as a utility vehicle or a tractor.

The conventional drum-type transmission described in Japanese Patent No. 5909400 comprises a shift gear rotatably supported on a first transmission rotation shaft and a power transmission gear non-rotatably supported on a second transmission rotation shaft and directly or indirectly meshed to the shift gear, a shifter member supported on the first transmission rotation shaft in a relatively non-rotatable yet axially movable manner, a drum member having a fork guide groove and being rotated around the axis, and a shift fork having a fork shaft parallel to the drum member, and a shift fork having a boss portion supported by the fork shaft so as to be movable in the axial direction and having an engagement pin engaged with the fork guide groove and a fork portion engaged with the shifter member.

Specifically, shift concave/convex portions are provided on the opposite surfaces of the shifter member and the shift gear. By rotating the drum member about the axis, the shift fork, whose axial position is regulated by the fork guide groove, is moved in the axial direction to realize a concave-convex engagement between the shifter member and the shift gear. Thus, the gear train including the shift gear and the power transmission gear enters the power transmission state, and power transmission between the first and second transmission rotation shafts is performed at the gear ratio of the gear train.

In such a drum-type transmission device, in addition to the power transmission state provided by the gear train, a parking state in which the rotation is forcibly stopped is also desired to produce. In this regard, in addition to the above-described configuration, the conventional drum-type transmission device further comprises a parking gear supported by the first transmission rotation shaft in a relatively non-rotatable manner, and a parking lock mechanism for engaging the operating arm (referred to as a park pole or the like) with the parking gear to forcibly stop the rotation of the first transmission rotation shaft in accordance with the rotation of the drum member to the parking position around the axis.

The parking lock mechanism comprises a locking member provided on the drum member, and a plate member having a concave portion into which the locking member can enter. The locking member is rotated in accordance with the rotation of the drum member to the parking position around the axis, as the plate member swings due to the movement of the locking member entering the concave portion, and the parking gear is then locked by using the swing of the plate member.

In a conventional drum-type transmission device, at the time of a parking lock release operation, the parking operation arm is disengaged from the parking gear by using the spring force of a parking release spring that urges the parking operation arm toward the unlock position. However, there exited such defect that in the case where the parking operation arm is sagged or burred, for example, while the vehicle is running, or where the vehicle is parked on a slope, when the torque between the parking gear and the parking operation arm is confined, the parking operation arm will remain in place (the parking operation arm does not separate from the parking gear) even when the unlock operation is performed.

As a parking lock mechanism that solves such a problem, there is known a mechanism (for example, JP Patent Publication 2018-158619) that comprises a rotatably movable lock cam component having a park lock activation cam portion that presses the parking operation arm that engages with a parking gear toward a lock position, and a park lock deactivation cam portion that presses the parking operation arm toward the unlock position, and when the parking lock is released, the locked state is forcibly released by using the park lock deactivation cam portion.

However, since the function to forcibly release the locked state is provided in the locking cam component, there exited the risk where the operation of the locking cam component may fail to release the locked state, due to such reasons as the wearing of the locking cam component itself, breakage or deterioration of the spring supporting the locking cam part, etc.

Further, in the conventional drum-type transmission device, a member (a locking member provided on the drum member or a plate member having a concave portion with which the locking member can engage, or the like) becomes worn that is intended for restricting the displacement of the parking operation arm and maintaining the locked state where the parking operation arm is engaged with the parking gear, the parking operation arm is separated from the parking gear, releasing the locked state, especially under such occasions as where the vehicle is parked on a slope, there is a risk that the vehicle may start moving unexpectedly and cause danger.

SUMMARY OF THE INVENTION

The present invention has been made in view of the above-described conventional technology, and aims to improve the reliability of a parking lock mechanism in a drum-type transmission device.

According to one aspect of the drum-type transmission device according to the present invention, the drum-type transmission device comprises a transmission shaft which is configured to drive a vehicle wheel, a drum member which is configured to perform a shift operation, a transmission operation shaft which is configured to rotate the drum member, and a parking lock mechanism. The parking lock mechanism comprises a parking gear which is configured to be provided on the transmission shaft so as to be relatively non-rotatable, a parking operation arm which is configured to be displaceable between a lock position at which the parking operation arm engages with the parking gear and an unlock position at which the parking operation arm separates from the parking gear, a parking release spring which is configured to urge the parking operation arm toward the unlock position, and a parking pushing member which is configured to push the parking operation arm according to the rotation of the drum member from a shift position or a neutral position to a parking position. One end of the transmission operation shaft is located near the parking operation arm. At the one end of the transmission operation shaft, there is provided an arm restraining portion which is capable of urging the parking operation arm toward the unlock position when the drum member rotates from the parking position to the shift position or the neutral position.

According to one aspect of the drum-type transmission device of the present invention, when the drum member rotates from the parking position to the shift position or the neutral position, the lock release mechanism by the spring force of the parking release spring and the lock release mechanism by the transmission operation shaft will function, so that even if the parking state cannot be released only with the reaction force received by the parking operation arm from the parking gear and the spring force of the parking release spring, the parking state will be reliably released by the operation of the arm restraining portion. Thereby, the reliability of the parking lock mechanism in the drum-type transmission device can be improved.

Further, in a configuration in which the parking pushing member is provided with a forced release function of a parking state as disclosed in Japanese Patent Application Publication No. 2018-158619, even if the parking pushing member fails to perform its release function sufficiently due to such reasons as wearing or the like, the parking state can be released by the arm restraining portion that is provided at a location (transmission operation shaft) separated from the parking pushing member, thereby improving the reliability of the parking lock mechanism in the drum-type transmission device.

Furthermore, by providing an arm restraining portion on the transmission operation shaft that is interlocked with the drum member and the parking pushing member, two lock release mechanisms can be operated with one operation system (operation of the transmission operation shaft). That is, a lock release mechanism using an arm restraining portion can be provided without introducing any additional operation system to an operation system that operates the rotation of the drum member and the parking pushing member using the transmission operation shaft. With a simple configuration and at a low cost, the reliability of the parking lock mechanism in the drum-type transmission device can be improved.

Further, in the drum-type transmission device of the embodiment of the present invention, the arm restraining portion is provided on the transmission operation shaft that is located upstream of the rotational force transmission path for rotating the drum member. Therefore, when the drum member is turned from the parking position to the shift position or the neutral position, the release operation force input to the transmission operation shaft can be transmitted to the parking operation arm without decreasing the release operation force, and therefore suppressing distinctive increase in the release operation force.

According to another aspect of the drum-type transmission device of the present invention, the drum-type transmission device comprises a transmission shaft which is configured to drive a vehicle wheel, a drum member which is configured to perform a shift operation, a transmission operation shaft which is configured to rotate the drum member, and a parking lock mechanism. The parking lock mechanism comprises a parking gear which is configured to be provided on the transmission shaft so as to be relatively non-rotatable, a parking operation arm which is configured to be displaceable between a lock position at which the parking operation arm engages with the parking gear and an unlock position at which the parking operation arm separates from the parking gear, a parking release spring which is configured to urge the parking operation arm toward the unlock position, and a parking pushing member which is configured to push the parking operation arm according to the rotation of the drum member from a shift position or a neutral position to a parking position. One end of the transmission operation shaft is located near the parking operation arm. At the one end of the transmission operation shaft, there is provided an arm restraining portion which is configured to restrict the movement of the parking operation arm toward the unlock position when the drum member is at the parking position.

According to another aspect of the drum-type transmission device of the present invention, when the drum member is located at the parking position, the lock mechanism by the parking pushing member and the lock mechanism by the arm restraining portion that restricts the movement of the parking operation arm toward the unlock position will function so that by having two lock mechanisms provided on separate members, even does occur such a situation where one of the lock mechanisms fails, the other lock mechanism can maintain the parking state, and the reliability of the parking lock mechanism is improved.

According to another aspect of the drum-type transmission device of the present invention, an arm restraining portion is provided on a transmission operation shaft that is interlocked with a drum member and a parking pushing member, so that one operation system can operate two lock mechanisms. That is, a lock release mechanism using an arm restraining portion can be provided without introducing any additional operation system to an operation system that operates the rotation of the drum member and the parking pushing member using the transmission operation shaft. With a simple configuration and at a low cost, the reliability of the parking lock mechanism in the drum-type transmission device can be improved.

In the drum-type transmission device according to the embodiment of the present invention, the arm restraining portion is formed by cutting out the one end of the transmission operation shaft, and is eccentric with respect to an axis of the transmission operation shaft; the portion of the parking operation arm facing the arm restraining portion overlaps with a part of a cutout portion of the transmission operation shaft when viewed from the axial direction of the transmission operation shaft at the lock position, whereas the portion of the parking operation arm facing the arm restraining portion is shaped so as not to hinder the displacement of the arm restraining portion accompanying the rotation of the transmission operation shaft at the unlock position.

According to another aspect of the drum-type transmission device of the present invention, the arm restraining portion can be provided to the transmission operation shaft without increasing the number of parts. Therefore, the reliability of the parking lock mechanism of the drum-type transmission device can be improved at a low cost and with a compact configuration by avoiding a significant increase in the manufacturing cost.

Further, the drum-type transmission device according to the embodiment of the present invention may also comprise a transmission operation arm which is configured to rotate the drum member via a shift gear train, and a parking lock holding mechanism, which is configured to engage a gear lock member with a lock member engagement portion which is provided to one of the plurality of shift gears constituting the shift gear train so as to inhibit the rotation of the shift gear, when the drum member is at the parking position.

According to this aspect, when the drum member is located at the parking position, the gear lock member can be engaged with the lock member engagement portion provided on the shift gear of the shift gear train to inhibit the rotation of the shift gear. It can be prevented for the shift lever that is provided on the vehicle from being unexpectedly operated avoiding the parking state being released during parking of the vehicle on which the drum-type transmission device is mounted.

In the drum-type transmission device of the embodiment of the present invention, the parking lock holding mechanism may comprise an electric actuator which is configured to slide the gear lock member in a direction in which the gear lock member is disengaged from the lock member engagement portion; the parking lock holding mechanism is configured to urge the gear lock member in a direction in which the gear lock member engages with the lock member engagement portion, at the time when the electric actuator is de-energized.

According to this aspect, with just a simple configuration of the electric actuator, even at the time when the power supply to the electric actuator cannot be performed due to, for example, running out of a battery, the gear lock member is engaged with the lock member engagement portion so that the operation of the shift gear train can be reliably inhibited when the drum member is at the parking position.

Further, in the drum-type transmission according to the embodiment of the present invention, the electric actuator may comprise a solenoid which is configured to have a plunger that makes linear movement; wherein the gear lock member may be provided at a distal end of the plunger. According to this aspect, the parking lock holding mechanism can be realized with a simple configuration, while an increase in manufacturing cost can be suppressed.

Provided in the embodiment of the present invention is a vehicle, which comprises a drive source, which is configured to be supported by a vehicle body, front wheels and rear wheels, which are configured to be supported by the vehicle body, and a transmission, which is configured to transmit the power of from the drive source to the front and rear wheels; wherein the transmission comprises the drum-type transmission device, an axle drive device, which is configured to drive the front wheels or the rear wheels, and a power take-out device, which is configured to drive the front wheels or the rear wheels; wherein the power take-out device comprises a parking brake mechanism, which is configured to selectively brake the rotation of the transmission shaft of the drum-type transmission device.

According to the vehicle of the embodiment of the present invention, the parking brake mechanism which brakes the rotation of the transmission shaft of the drum-type transmission device is provided within the power take-out device, hence it can be realized for the parking brake mechanism to be provided in the transmission, without making additional modifications to the configurations of the drum-type transmission device as well as the axle drive device.

BRIEF DESCRIPTION OF THE DRAWINGS

FIG. 4A and FIG. 4B are a sectional view corresponding to the position A-A in FIG. 3, wherein FIG. 4A shows a released parking state, and FIG. 4B shows a parking state.

FIG. 5A and FIG. 5B are a sectional view for explaining a parking lock mechanism in another embodiment of the drum-type transmission mechanism, wherein FIG. 5A shows a released parking state, and FIG. 5B shows a parking state.

FIG. 6A and FIG. 6B are a sectional view corresponding to a position B-B in FIG. 3, wherein FIG. 6A shows a released parking state, and FIG. 6B shows a parking state.

DESCRIPTION OF THE EMBODIMENTS

Figure 1:
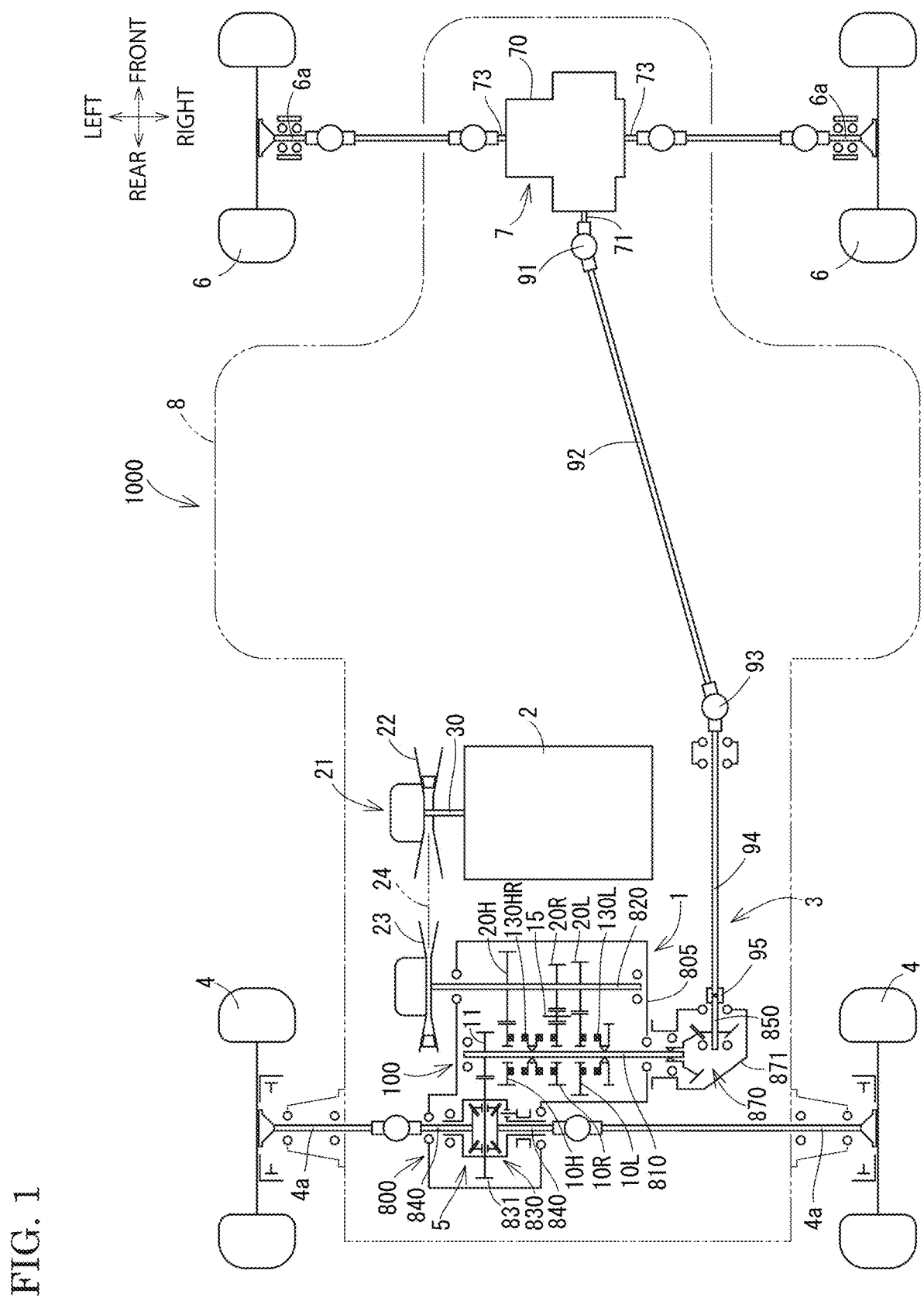
FIG. 1 is a schematic plan view partially showing a skeleton diagram of a power transmission mechanism of a vehicle to which an embodiment of a drum-type transmission mechanism is applied.

Hereinafter, embodiments of the present invention will be described with reference to the drawings. FIG. 1 shows a schematic transmission diagram of a working vehicle 1000 to which the drum-type transmission 1 according to the present embodiment is applied. The drum-type transmission 1 is suitably used for a travelling system transmission path of a working vehicle such as a tractor or a utility vehicle. First, a schematic configuration of the working vehicle 1000 will be described with reference to FIG. 1.

The working vehicle 1000 comprises a vehicle body 8, an engine 2 as a drive source supported by the vehicle body 8, rear wheels 4 and front wheels 6 supported by the vehicle body 8, and a drum-type transmission 1 that is interposed in the power transmission mechanism 3 reaching from the engine 2 to the rear wheels 4 or the front wheels 6 which function as the drive wheels.

The power transmission mechanism 3 transmits the power of the engine 2 to the front axle drive device 7 disposed in front of the engine 2 via the drum-type transmission device 1 in the transmission 800 disposed behind the engine 2, and to the drum-type transmission device 1 and to the rear axle drive device 5 disposed in the transmission 800.

The power transmission mechanism 3 comprises a belt transmission 21 driven by the engine 2, and a transmission 800 having the drum-type transmission 1 and the rear axle drive device 5 driven by the belt transmission 21. The rear axle drive device 5 drives a pair of left and right rear wheels 4 and a rear axle 4a. A front axle driving device 7 for driving a pair of left and right front wheels 6 and a front axle 6a is provided in front of the engine 2. The output of the drum-type transmission device 1 is distributed and transmitted to the rear axle drive device 5 and the front axle drive device 7.

As shown in FIG. 1, the belt transmission 21 comprises a driving pulley 22 and a driven pulley 23 arranged in a longitudinal direction, and a belt 24 as an endless body is wound around the driving pulley 22 and the driven pulley 23. The driving pulley 22 is attached in a relatively non-rotatable manner to the power output shaft 30 of the engine 2 extending in the left-right direction of the vehicle body, and the driven pulley 23 is attached in a relatively non-rotatable manner to the power input shaft 820 of the transmission 800 extending in the left-right direction of the vehicle body. The power output shaft 30 is a rotation center axis (pulley shaft) of the driving pulley 22, and the power input shaft 820 is a rotation center axis (pulley shaft) of the driven pulley 23. The belt transmission 21 changes the width of the pulley grooves of both pulleys 22 and 23 in accordance with the change in the rotation speed of the engine 2 to form a continuously variable transmission (CVT) with a configuration where the ratio of output/input rotation speed is changed continuously. The power input shaft 820 of the transmission 800 constitutes a power input shaft of the drum-type transmission 1 provided in the transmission 800.

The rear axle drive device 5 is provided in the transmission 800, and comprises a rear wheel differential gear mechanism 830 to which the output of the drum-type transmission 1 is input, and a pair of left and right rear wheel output shafts 840 extending in the left-right direction. Each rear wheel output shaft 840 projects outward beyond the transmission housing 805 respectively to the left and right, and is respectively interlocked with the rear axle 4*a* of the corresponding left and right rear wheel 4 via a universal joint and a transmission shaft. The rear wheel differential gear mechanism 830 is housed in the transmission housing 805, and the left and right rear wheel output shafts 840 are differentially connected to each other via the rear wheel differential gear mechanism 830.

In a front axle drive housing 70 as a housing of the front axle drive device 7, the front axle drive device 7 supports an input shaft 71 extending in the longitudinal direction of the vehicle body and a pair of left and right output shafts 73 extending in the left-right direction of the vehicle body in a plan view. Each output shaft 73 of the front axle drive device 7 projects outward beyond the front axle drive housing 70 respectively to the left and right, and is interlocked with the front axle 6*a* of the corresponding left and right front wheel 6 via a universal joint and a transmission shaft. A front wheel differential mechanism (not shown) is provided in the front axle drive housing 70, and the left and right output shafts 73 are differentially connected to each other via the front wheel differential mechanism. The rear end of the input shaft 71 projects rearward beyond the front axle drive housing 70, and is connected to a front end of a front wheel output shaft 850 which is supported to the power take-out case 871 connected with one side surface of the transmission housing 805 and protrudes forward beyond a transmission housing 805 of the transmission 800 via from front to back through a universal joint 91, a front power transmission shaft 92, a universal joint 93, a rear power transmission shaft 94, and a shaft joint 95.

In the present embodiment, in the working vehicle 1000, both the rear wheels 4 and the front wheels 6 function as drive wheels. More specifically, the working vehicle 1000 has a pair of left and right rear wheels 4 acting as main drive wheels, and a pair of left and right front wheels 6 acting both as auxiliary drive wheels and also steering wheels. The rotational power shifted by the drum-type transmission device 1 is transmitted to the rear wheels 4 and the front wheels 6.

Figure 2:
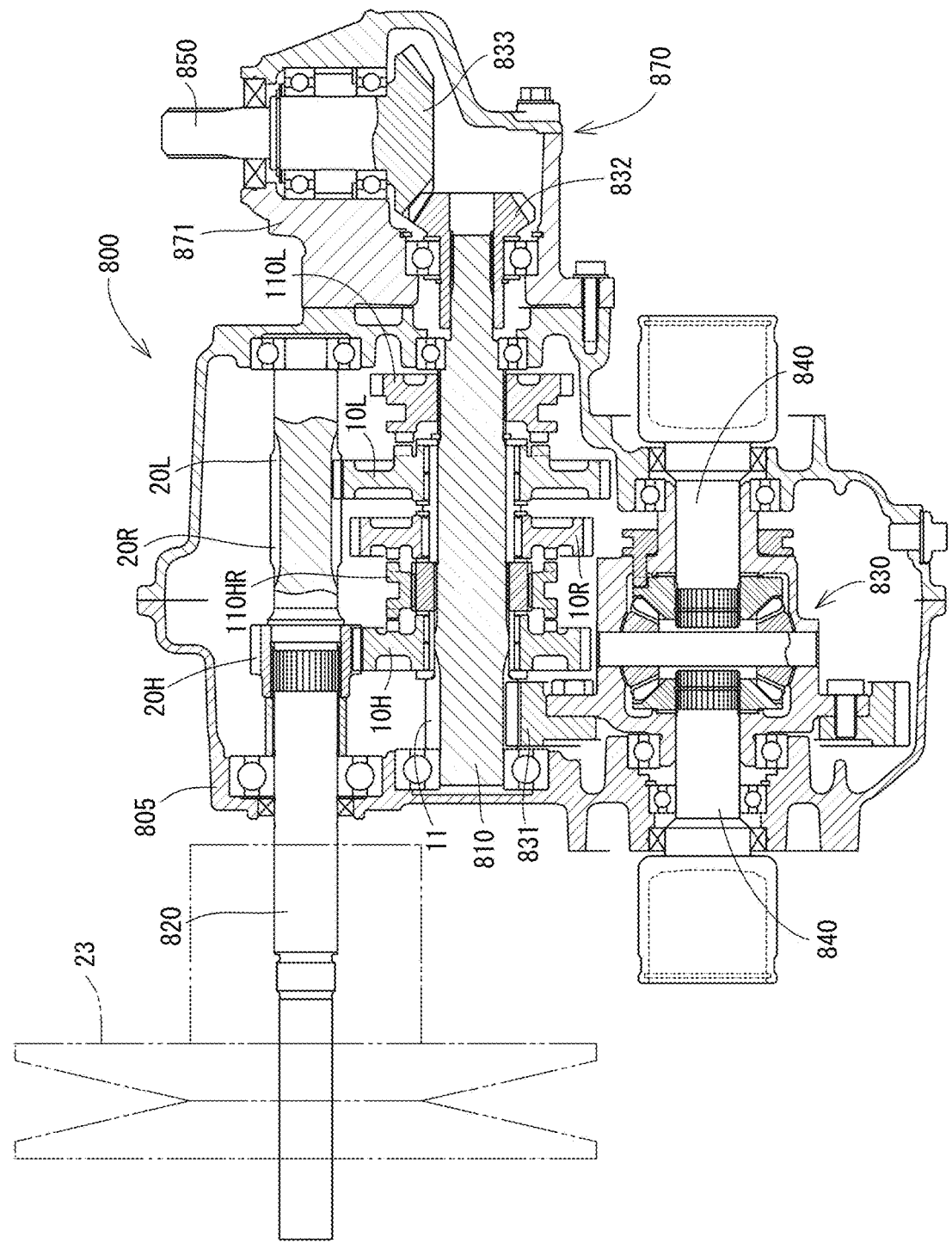
FIG. 2 is a schematic sectional view of the same embodiment, which extends in the direction to which the axles of a transmission shaft, a power input shaft, a rear wheel output shaft, and a front wheel output shaft are parallel.
Figure 3:
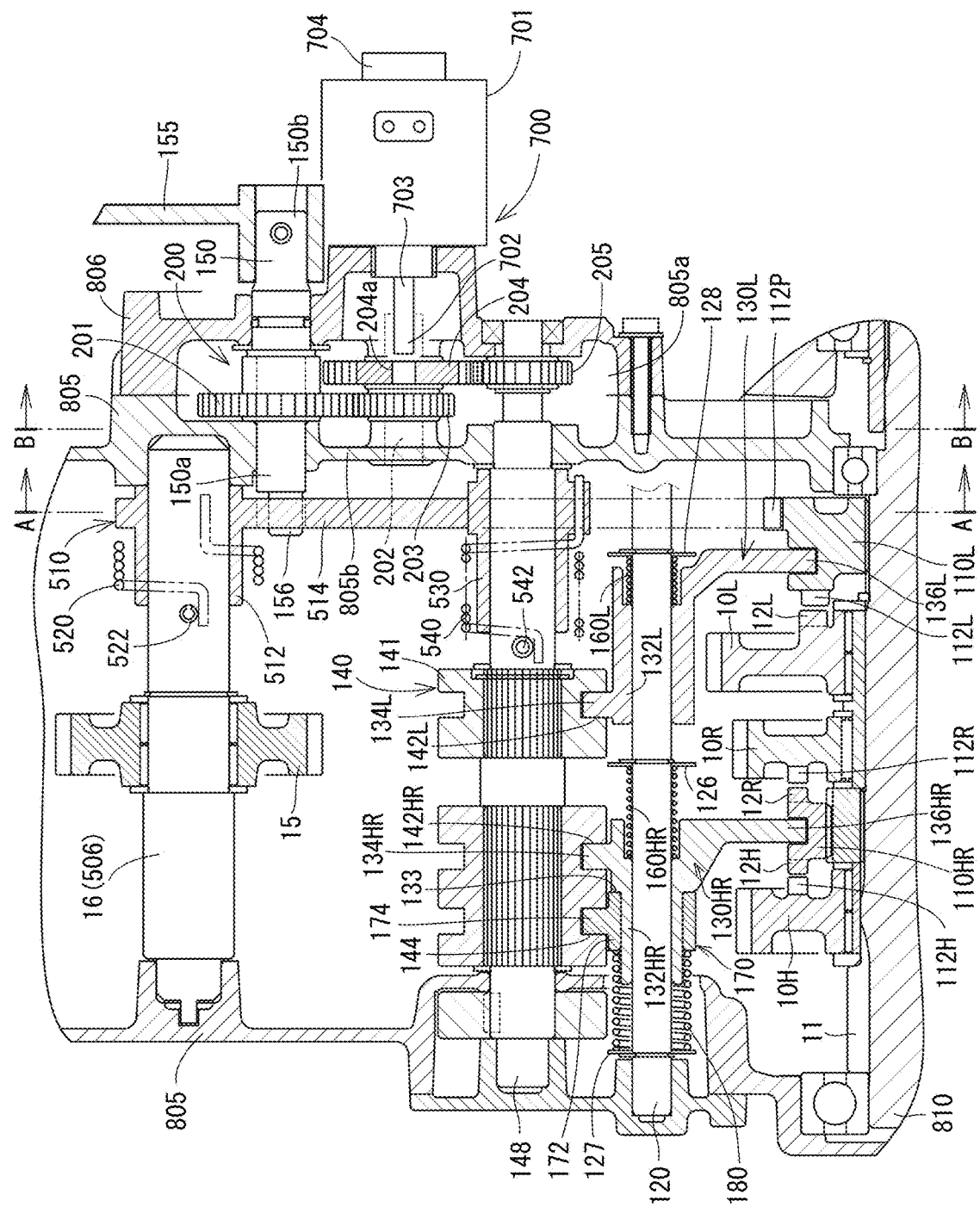
FIG. 3 is a schematic sectional view of the same embodiment, which extends in the direction to which the axles of a reverse idle shaft, a fork shaft, a drum member, and a transmission operation shaft are parallel.

Next, the drum-type transmission device 1 will be described with reference to FIG. 1 to FIG. 4. FIG. 2 is a sectional view extending in the direction to which the axles of a transmission shaft 810, a power input shaft 820, a rear wheel output shaft 840, and a front wheel output shaft 850 are parallel. FIG. 3 is a sectional view extending in the direction to which the axles of a reverse idle shaft 16, a fork shaft 120, a drum member 140, and a transmission operation shaft 150 are parallel.

The drum-type transmission device 1 is configured so as to transmit the rotational power between the transmission shaft 810 and the power input shaft 820 provided in parallel with each other. Specifically, as shown in FIG. 1 to FIG. 3, the drum-type transmission device 1 comprises a shift gear 10 which is supported to the transmission shaft 810 in a relatively rotatable manner, a transmission gear 20 which is supported to the power input shaft 820 in a relatively non-rotatable manner (or integrally formed thereto) and meshed directly or indirectly with the shift gear 10, and a drum-type transmission operation mechanism 100 for selectively bringing the shift gear 10 into a power transmission state.

In the present embodiment, the shift gear 10 comprises a forward high-speed shift gear 10H, a forward low-speed shift gear 10L, and a reverse shift gear 10R. The transmission gear 20 comprises a transmission gear 20H which meshes with the shift gear 10H to form a forward high-speed gear train together with the shift gear 10H, a transmission gear 20L which meshes with the shift gear 10L to form a forward low-speed gear train together with the shift gear 10L, and a transmission gear 20R which meshes with the shift gear 10R via a reverse idle gear 15 (see FIG. 3) to form a reverse gear train together with the shift gear 10R and the reverse idle gear 15.

In the present embodiment, the power input shaft 820 acts as a transmission input shaft for operatively inputting rotational power from a drive source such as the engine 2 and the transmission shaft 810 acts as a transmission output shaft outputs the post-shift rotational power to the drive wheels. The transmission shaft 810 is fixedly provided with a transmission output gear 11 that meshes with the final gear 831 of the rear wheel differential gear mechanism 830, and the transmission shaft 810 rotates with the rear wheel 4. Further, a driven bevel gear 833 attached to the rear end of the front wheel output shaft 850 in a relatively non-rotatable manner and meshes with a drive bevel gear 832 which is attached to one end (right end in the present embodiment) of the transmission shaft 810. The rotational power of the transmission shaft 810 is also transmitted to the front wheel output shaft 850. The power take-out device consists of the drive bevel gear 832, the driven bevel gear 833 and the front wheel output shaft 850.

That is, as shown in FIG. 1 and FIG. 2, the transmission 800 comprises a transmission housing 805, a power input shaft 820 which is supported so as to be operatively connected with the engine 2 as a drive source with one of its ends protruding beyond the transmission housing 805 while remains to be rotatably around the axis of the transmission housing 805 and acts as a transmission input shaft, the transmission shaft 810 which is supported so as to be rotatably around the axis of the transmission housing 805 and acts as a transmission output shaft, and a drum-type transmission device 1 that transmits the rotational power from the power input shaft 820 to the transmission shaft 810 in a multiple stages manner.

Transmission 800 further comprises the rear axle drive device 5 having a pair of left and right rear wheel output shafts 840, and the rear wheel differential gear mechanism 830 which differentially transmits the rotational power that is operatively input from the transmission output shaft (transmission shaft 810) to the pair of left and right rear wheel output shafts 840. Further, transmission 800 comprises a front wheel output shaft 850 that outputs the rotational power of transmission shaft 810 to a transmission path other than the rear wheel output shaft 840.

The drum-type transmission operation mechanism 100 is configured to selectively bring a plurality of shift gears 10 into a power transmission state and bring the drum-type transmission device 1 into a desired gear position engagement state.

More specifically, as shown in FIG. 1 to FIG. 3, the drum-type transmission operation mechanism 100 comprises a shifter member 110 which is supported to the transmission shaft 810 so as to be relatively non-rotatable and movable in the axial direction so as to selectively concave-convex engage with the shift gear 10, a fork shaft 120 parallel to the transmission shaft 810, a shift fork 130 which is supported to the fork shaft 120 so as to be movable in the axial direction, and a drum member 140 which rotates around an axis parallel to the transmission shaft 810.

More specifically, shift concave/convex portions 112 and 12 are provided on the opposite surfaces of the shifter member 110 and the shift gear 10 respectively. By moving the shifter member 110 along the axial direction as well as in a direction approaching the transmission shift 10, the shift concave/convex portion 112 of the shifter member 110 engages with the shift concave/convex portion 12 of the shift gear 10, thereby causing the shift gear 10 and the transmission shaft 810 to form an integral rotation configuration via the shifter member 110.

As shown in FIGS. 1 to 3, in the present embodiment, a shift gear 10H, a shift gear 10R, and a shift gear 10L are provided on the shift shaft 810 in order from left to right in the axial direction.

The drum-type transmission operation mechanism 100 comprises a first shifter member 110HR and a second shifter member 110L as the shifter member 110, wherein the first shifter member 110HR is supported to the shift shaft 810 at a position within the range between the shift gear 10H and the shift gear 10R so as to be relatively non-rotatable and axially movable along the shift shaft 810, and the first shifter member 110HR is capable of engaging respectively with the shift gear 10H and the shift gear 10R in a concave-convex manner when it moves along the axial direction from left to right; the second shifter member 110L is supported to the shift shaft 810 at a position facing the shift gear 10L so as to be relatively non-rotatable and axially movable along the shift shaft 810, and the second shifter member 110L is capable of engaging with the shift gear 10L in a concave-convex manner when it moves along the axial direction (from right to left in this embodiment) approaching the shift gear 10L.

The first shifter member 110HR has a high-speed shift concave/convex portion 112H and a reverse concave/convex portion 112R, wherein the high-speed shift concave/convex portion 112H can be engaged in a concave-convex manner with the shift concave/convex portion 12H of the shift gear 10H, on the left side to an axial direction facing the shift gear 10H; the reverse concave/convex portion 112R can be engaged in a concave-convex manner with the shift concave/convex portion 12R of the shift gear 10H, on the right side to an axial direction facing the shift gear 10R.

The second shifter member 110L has a low-speed shift concave/convex portion 112L on the left side to an axial direction facing the shift gear 10L, which can be engaged in a concave-convex manner with the shift concave/convex portion 12L of the shift gear 10L.

As shown in FIG. 3, the drum-type transmission operation mechanism 100 comprises a first shift fork 130HR and a second shift fork 130L as the shift fork 130, which are configured to move the first shifter member 110HR and the second shifter member 110L along the axial direction respectively.

As shown in FIG. 3, the first shift fork 130HR comprises a first boss portion 132HR which is supported to the fork shaft 120 movably in the axial direction, a first engagement pin portion 134HR which engages with a first fork guide groove 142HR formed in the drum member 140, and a first fork portion 136HR which engages with the first shifter member 110HR. When the first shift fork 130HR moves along the axial direction on the fork shaft 120, it will bring about the movement of the first shifter member 110HR in the axial direction on the transmission shaft 810.

More specifically, the first shift fork 130HR and the first shifter member 110HR can be positioned relative to the axial direction at a reference position at which the first shifter member 110HR does not engage in a concave-convex manner with neither the shift gear 10H nor the shift gear 10R, a high-speed position at which the first shifter member 110HR engages with the shift gear 10H in a concave-convex manner, and a reverse position at which the first shifter member 110HR engages with the shift gear 10R in a concave-convex manner. Moreover, FIG. 3 depicts that the first shift fork 130HR and the first shifter member 110HR are positioned at the reference position.

The second shift fork 130L comprises a second boss 132L which is supported to the fork shaft 120 movably in the axial direction, a second engagement pin portion 134L which engages with a second fork guide groove 142L formed in the drum member 140, and a second fork portion 136L that engages with the second shifter member 110L. When the second shift fork 130L moves along the axial direction on the fork shaft 120, it will bring about the movement of the second shifter member 110L in the axial direction on the transmission shaft 810.

More specifically, the second shift fork 130L and the second shifter member 110L can be positioned relative to the axial direction at a reference position at which the second shifter member 110L does not engage in a concave-convex manner with the shift gear 10L nor, and a low-speed position at which the second shift fork 130L engages with the shift gear 10L. Moreover, FIG. 3 depicts that the second shift fork 130L and the second shifter member 110L are positioned at the reference position.

The drum member 140 is configured to rotate around an axis according to a shift operation. In the present embodiment, as shown in FIG. 3, the drum-type shift operation mechanism 100 is provided with a transmission operation shaft 150 that receives the shift operation, and the drum member 140 is operatively connected to the transmission operation shaft 150. In the present embodiment, the transmission operation shaft 150 is operatively connected to the drum member 140 via the shift gear train 200.

The transmission operation shaft 150 is arranged extending in the left-right direction of the vehicle and in parallel with the rotation axis of the drum member 140. One end 150*a* (the left end in the present embodiment) of the transmission operation shaft 150 is disposed inside the transmission housing 805, while the other end 150*b* (the right end in the present embodiment) is supported by the transmission housing 805 so as to be rotatable around the axis while protrudes beyond the transmission housing 805. As shown in FIG. 1 and FIG. 3, the transmission operation shaft 150 is rotated around the axis by, for example, a transmission operation arm 155 which is attached to the other end 150*b*.

Alternatively, the transmission operation shaft 150 can also be rotated around the axis by an electric motor. In this case, the transmission operation arm 155 is removed, and an electric motor (not shown) is mounted on the other end 150*b* of the transmission operation shaft 150. In this case, it is preferable to provide an angle sensor (not shown) for detecting the position of the drum member 140 around the axis.

As shown in FIG. 3, the drum member 140 comprises a drum main body 141 in which fork guide grooves (the first and second fork guide grooves 142HR and 142L in the present embodiment) are formed, and a drum shaft 148 that supports the main body 141 at the same axis as the drum main body 141.

As shown in FIG. 3, the drum-type shift operation mechanism 100 further comprises, a first shift fork push spring 160HR that pushes the first boss portion 132HR along the axial direction to the left, a slider member 170 which is extrapolated and supported to the first boss portion 132HR so as that the first boss portion 132HR is movable along the axial direction and a slider member push spring 180 which push the slider member 170 along the axial direction to the right.

The first shift fork push spring 160HR is set in such a way that, when the first shift fork 130HR is in a free state, the first shift fork push spring 160HR will push the first boss portion 132HR along the axial direction to the left with a biasing force enabling the movement of the first shifter member 110HR to the high-speed position where the first shift fork member 110HR engages with the shift gear 10H.

More specifically, the first shift fork push spring 160HR is configured such that its right end in the axial direction is a fixed end that is locked by a locking member 126 provided on the fork shaft 120, and the left end in the axial direction is a movable end that is engaged with the right surface in the axially direction of the first boss portion 132HR.

The slider member 170 is supported by the first boss portion 132HR so as to be movable in the axial direction so that the moving end to the right in the axial direction is defined by the stop portion 133 provided on the first boss portion 132HR. The position of the slider member 170 in the axial direction is regulated by the slider guide groove 144 provided at the center.

Specifically, the slider member 170 has a slider body 172 externally movably inserted in the first boss portion 132HR so as to be movable in the axial direction, and a slider engagement pin portion 174 that is engaged with the slider guide groove 144.

The slider member push spring 180 is configured to press the slider member 170 to the right in the axial direction with a biasing force larger than that of the first shift fork push spring 160HR.

That is, the slider member push spring 180 is set in such a way that, when the first shift fork 130HR and the slider member 170 are in a free state, the slider member push spring 180 will push the first boss portion 132HR along the axial direction to the right via the slider member 170 with a biasing force enabling the movement of the first shifter member 110HR to the reverse position where the first shifter member 110HR engages with the shift gear 10R, against the biasing force by the first shift fork push spring 160HR that urges the first shift fork 130HR toward the first side in the axial direction.

More specifically, the slider member push spring 180 is configured such that its left end in the axial direction is a fixed end that is locked by a locking member 127 provided on the fork shaft, and the right end in the axial direction is a movable end that is engaged with the left surface in the axial direction of the slider member 170.

In the present embodiment, as shown in FIG. 3, the drum-type shift operation mechanism 100 further comprises a second shift fork push spring 160L, which pushes the second boss portion 132L in the direction in which the second shifter member 110L is pressed toward the shift gear 10L.

As described above, in the present embodiment, the shift gear 10L is located on the left side in the axial direction to the second shifter member 110L. Therefore, the second shift fork push spring 160L moves the second boss portion 132L to the left side in the axial direction.

More specifically, the second shift fork push spring 160L is configured such that its right end in the axial direction is a fixed end that is locked on a locking member 128 provided on the fork shaft 120, and the left end in the axial direction is a movable end that is engaged with the right surface in the axial direction of the second boss portion 132L.

The second shift fork push spring 160L is set in such a way that, when the second shift fork 130L is in a free state, the second shift fork push spring 160L will push the second boss 132L with a biasing force enabling the movement of the second shifter member 110L to a low-speed position where the second shifter member 110L engages with the shift gear 10L.

In the drum-type transmission 1, the drum member 140 is configured to take an operation position around an axis corresponding to a shift stage (including a neutral stage) that the drum-type transmission 1 can take.

In the present embodiment, the drum-type transmission 1 is configured to be able to take a neutral stage, a forward high-speed stage, a forward low-speed stage, and a reverse stage. Therefore the drum member 140 is configured to take a neutral position, a high-speed position, a low-speed position and a reverse position around the axis.

Specifically, in the present embodiment, the drum member 140 takes the high-speed position when rotated from the neutral position to one side around the axis, the low-speed position when further rotated from the high-speed position to one side around the axis, and the reverse position when it is rotated from the neutral position to the other side around the axis.

The drum-type transmission 1 can further take a parking position, and the drum member 140 can thereby take a parking position in addition to the above mentioned operation positions. In the present embodiment, the drum member 140 is configured to take the parking position when the drum member 140 is further rotated around the axis from the reverse position to the other side. The configuration for producing the parking state will be described later.

The drum-type shift operation mechanism 100 further comprises a detent mechanism (not shown) for locking the drum member 140 at each operation position. In the drum-type transmission 1, the shift forks 130HR and 130L are fed by the intermittent rotation of the drum member 140 according to the shapes of the fork guide grooves 142HR and 142L and the slider guide groove 144. Thereby, the drum-type transmission device 1 is set to any one of the forward low-speed state, the forward high-speed state, the reverse drive state, the neutral state, and the parking state. A configuration similar to that of the drum-type transmission 1 of the present embodiment is disclosed in, for example, Japanese Publication No. 2018-91376.

As is apparent from FIG. 3, the drum member 140 rotates around the axis of the drum shaft 148 in accordance with the rotation of the transmission operation shaft 150 which is operatively connected via the shift gear train 200. The transmission operation arm 155 is attached to one end (right end in the present embodiment) of the transmission operation shaft 150 in a non-rotatable manner. The transmission operation arm 155 rotates around the axis of the transmission operation shaft 150 in conjunction with the operation of a shift operation tool (lever, pedal, dial, etc.) not shown. The drum shaft 148 is connected to the detent mechanism (not shown) for locking the drum member 140 at each operation position.

In the shift gear train 200, the shift drive gear 201 fixed to the transmission operation shaft 150 meshes with the first shift idle gear 203 fixed to the shift idle shaft 202. A second shift idle gear 204 having a diameter larger than that of the first shift idle gear 203 is fixed to the shift idle shaft 202. The first and second shift idle gears 203 and 204 are relatively non-rotatable. The second shift idle gear 204 meshes with a shift gear 205 fixed to one end (the right end in the present embodiment) of the drum shaft 148. The transmission operation shaft 150 and the gears 201, 203, and 204 rotate with the rotation of the transmission operation arm 155, and the shift gear 205 and the drum shaft 148 rotate in conjunction therewith.

Here, the right end of the drum shaft 148, the transmission operation shaft 150, and the shift gear train 200 are accommodated in a shift gear chamber 805a provided on an outer side surface (the right side surface in the present embodiment) of the transmission housing 805. The shift gear chamber 805a is isolated by a partition 805b from the internal space where the transmission housing 805 in which the drum body 141, the shift gear 10, the transmission gear 20, and the like are housed. The shift gear chamber 805a is covered with a removable shift gear chamber cover 806, and the other end 150b of the transmission operation shaft 150 projects rightward beyond from the shift gear chamber cover 806.

Figure 4A:
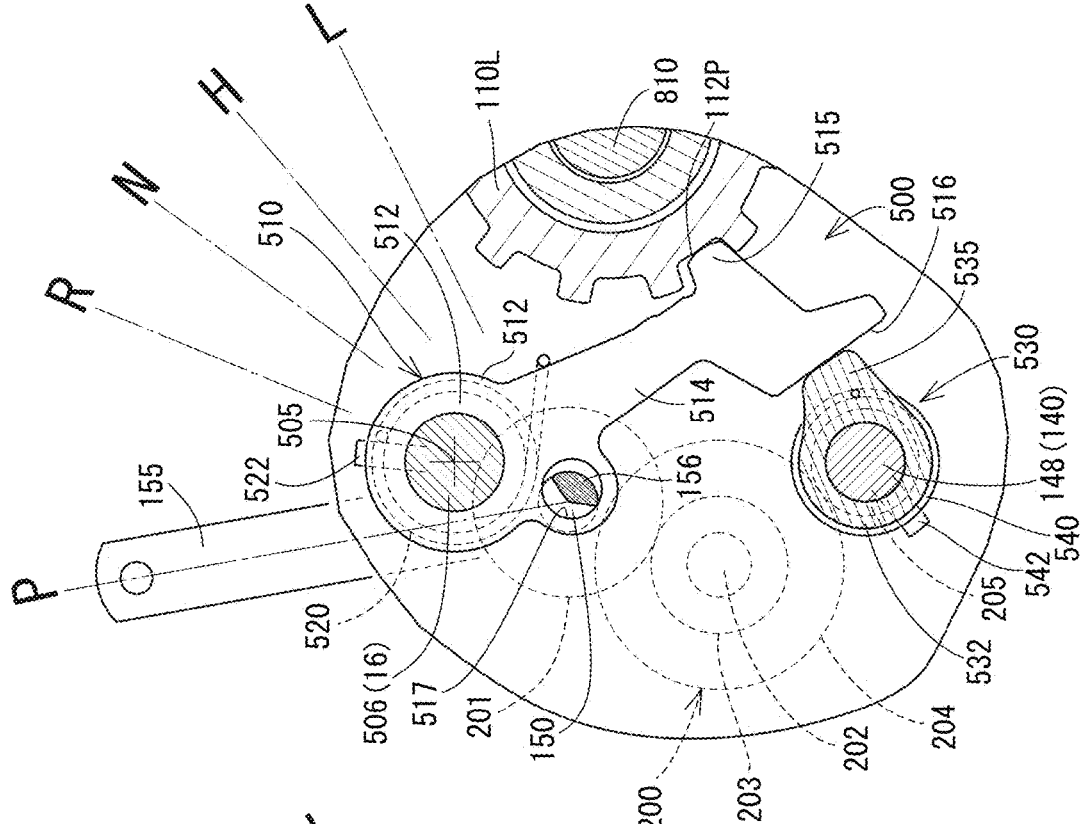
Figure 4B:
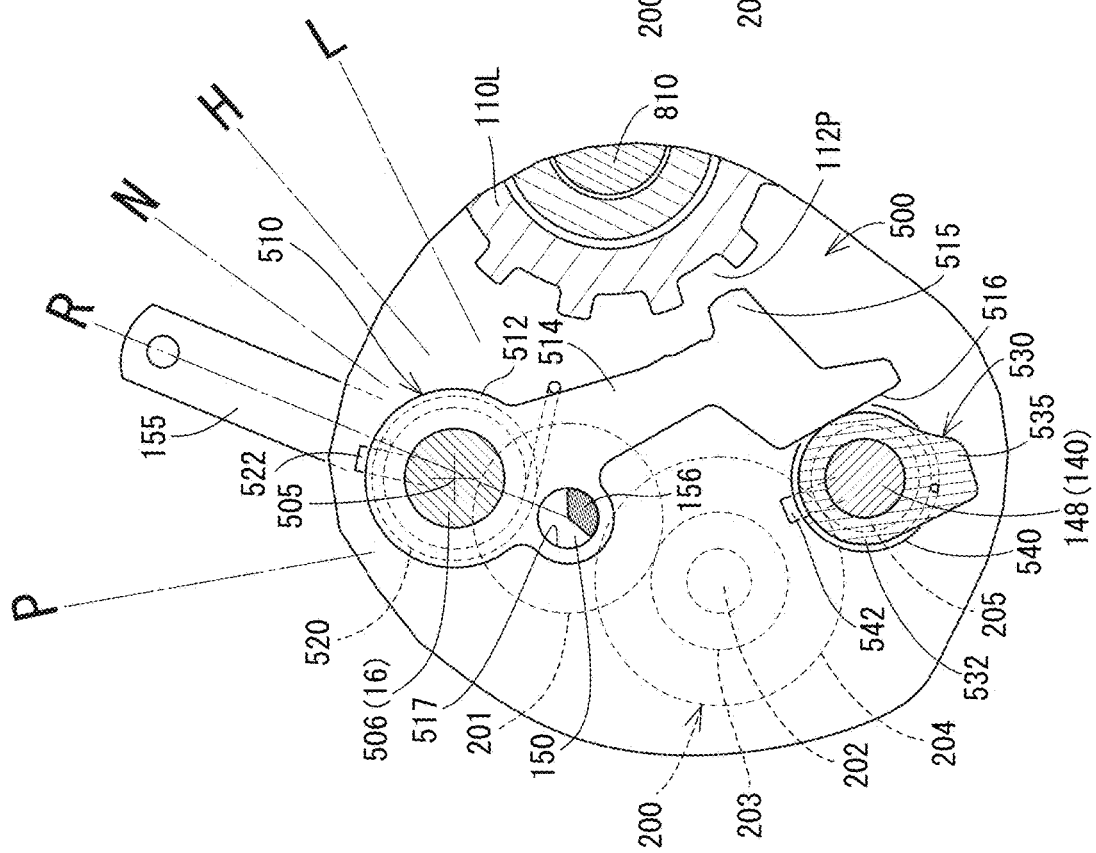

Hereinafter, an example of the parking structure of the drum-type transmission device 1 will be described. FIG. 4A and FIG. 4B is a sectional view corresponding to the position AA in FIG. 3. FIG. 4A shows a released parking state, and FIG. 4B shows a parking state (locked state).

As shown in FIG. 3 and FIG. 4, in the drum-type transmission device 1, a parking concave/convex portion 112P that faces outward in the radial direction is provided to the shifter member (second shifter member 110L) which engages with the corresponding shift gear (shift gear 10L) in a concave-convex manner due to the movement in the axial direction by the shift fork (second shift fork 130L) and brings the shift gear into a power transmission state.

In addition, the drum-type transmission device 1 is provided with a parking lock mechanism 500 that engages in a concave-convex manner with the parking concave/convex portion 112P to forcibly stop the rotation of the shifter member (second shifter member 110L). In the present embodiment, the second shifter member 110L having the parking concave/convex portion 112P also serves as a parking gear.

As described above, the drum-type transmission device 1 is configured such that the shifter member (second shifter member 110L) that engages and disengages with the power transmission by the corresponding shift gear (shift gear 10L) also serves as a parking gear. Accordingly, it is possible to reduce the cost and the volume in the axial direction by reducing the number of parts.

Note that a parking gear separate from the shifter member may be provided on the transmission shaft 810 in a relatively non-rotatable manner, and the parking gear may be provided with the parking concave/convex portion 112P.

As shown in FIG. 3 and FIG. 4, the parking lock mechanism 500 comprises a parking operation arm 510 that may swing around the swing axis 505 parallel to the transmission shaft 810 supporting the second shifter member 110L and has on its free end an engagement portion 515 that can be engaged with the parking concave/convex portion 112P, a parking release spring 520 that urges the parking operation arm 510 around the swing axis 505 toward the parking release direction, and a parking pushing member 530.

The parking operation arm 510 may switch around the swing axis 505 direction between a lock position (FIG. 4B) in which the engagement portion 515 is engaged with the parking concave/convex portion 112P and the second shifter member 110L is forcibly stopped to rotate, and an unlock position (FIG. 4A) in which the engagement portion 515 is removed outward in the radial direction to separate from the parking concave/convex portion 112P.

The parking pushing member 530 pushes the parking operation arm 510 toward the lock position against the urging force of the parking release spring 520 by using the movement of the drum member 140 rotating around the axis toward the parking position.

In the present embodiment, as shown in FIG. 3 and FIG. 4, the parking pushing member 530 comprises a pushing member main portion 532 supported by the drum member 140 and a cam pushing portion 535 that extends radially outward beyond the pushing member main portion 532.

As shown in FIG. 4A, the cam pushing portion 535 is configured so as not to act on the parking operation arm 510 when the drum member 140 is located at the shift position and the neutral position (reverse position as shown in the illustrated embodiment), while as shown in FIG. 4B, the parking operation arm 510 is pushed toward the lock position due to the rotation of the drum member 140 toward the parking position against the urging force of the parking release spring 520 (see FIG. 3).

In the present embodiment, as shown in FIG. 3 and FIG. 4, the parking operation arm 510 comprises a boss portion 512 which is extrapolated in a relatively rotatable manner to a pivot 506 that defines a swing axis 505, and an arm portion 514 that extends outward in the radial direction from the boss portion 512. An engagement portion 515 is provided on a side of the free end of the arm portion 514 that faces the parking concave/convex portion 112P. A pressure receiving surface 516 with which the cam pushing portion 535 is engaged is provided on the side opposite to the concave/convex portion 112P of the arm portion 514.

In the present embodiment, as shown in FIG. 3, a reverse idle shaft 16 supporting a reverse idle gear 15 forming a reverse gear train serves as a pivot 506 that supports a parking operation arm 510 in a swingable manner. That is, the axis of the reverse idle shaft 16 forms the swing axis 505 of the parking operation arm 510.

As shown in FIG. 3 and the like, with its one end being operatively connected to the parking operation arm 510 and the other end operably connected to the pivot 506 (via a pin 522 in the present embodiment), the parking release spring 520 is used to extrapolate the pivot 506 as the coil spring.

In the present embodiment, as described above, the drum member 140 is configured to take the reverse position when rotated from the neutral position to the other side around the axis, and take the parking position when further rotated from the reverse position to the other side around the axis. The operation position of the drum member 140 is determined by the operation position of the transmission operation arm 155. That is, when the transmission operation arm 155 is in the parking position P, the reverse position R, the neutral position N, the high-speed position (high-speed forward position) H, and the low-speed position (low-speed forward position) L, the drum member 140 will be in the parking position, the reverse position, the neutral position, the high-speed position, and the low-speed position.

Therefore, the cam pushing portion 535 is configured such that when the transmission operation arm 155 is located at the reverse position R, the neutral position N, the high-speed position H, and the low-speed position L (the drum member 140 is at the neutral position, the reverse position, the high-speed position and the low-speed position), it will not engage with the pressure receiving surface 516, and when the transmission operation arm 155 is rotated from the reverse position R to the parking position P (when the drum member 140 is rotated from the reverse position to the parking position) without engaging with the pressure receiving surface 516 (When rotated), it will engage with the pressure receiving surface 516, and pushes the parking operation arm 510 toward the lock position against the urging force of the parking release spring 520.

As described above, in the present embodiment, the parking pushing member 530 is supported by the drum member 140, whereby the rotation of the parking operation arm 510 is pushed toward the lock position making use of the rotation of the drum member 140 to the parking position, making it possible for the parking lock mechanism 500 to be more compact.

The drum-type transmission device 1 according to the present embodiment further comprises the following configuration in order to exhibit a standby operation in the shift operation to the parking position.

That is, in the present embodiment, the pushing member main portion 532 of the parking pushing member 530 is extrapolated externally to the drum member 140 in a relatively rotatable manner.

Then, as shown in FIG. 3, FIG. 4A and FIG. 4B, the parking pushing member 530 and the drum member 140 are connected with via a parking coil spring 540, that is externally extrapolated to the drum member 140, of which one end is operatively connected to the parking pushing member 530, and the other end (in this embodiment via the pin 542) is operatively connected to the drum member 140.

The parking coil spring 540 is configured such that, where the circumferential load applied to the cam pushing portion 535 is equal to or less than a predetermined value, the parking pressing member 530 and the drum member 140 is connected in a relatively non-rotatable manner that the parking pressing member 530 will rotate integrally with the rotation of the drum member 140 around the axis, whereas where the circumferential load applied to the cam pushing portion 535 exceeds the predetermined value, the parking coil spring 540 will elastically deform so as to allow the drum member 140 to precede the parking pushing member 530 in rotation around the axis and therefore a relative rotation occurs.

In the present embodiment, the parking coil spring 540 is configured to adapt to elastic deformation in the diameter decreasing direction when the drum member 140 is rotated to precede the parking pushing member 530 in the relative rotation.

With such a configuration, a standby operation can be obtained in the shift operation to reach the parking gear. That is, such a situation is assumable where during the process in which the cam pushing portion 535 swings the parking operation arm 510 toward the lock position in accordance with the rotation of the drum member 140 toward the parking position, the parking operation arm 510 may be prevented from swinging to the lock position due to abutment between the engagement portion 515 with the convex portion of the parking concave/convex portion 112P of the shifter member 110L.

In this case, a circumferential load exceeding the predetermined value will be applied to the cam pushing portion 535. Accordingly, the drum member 140 will cause elastic deformation to the parking coil spring 540 and precede the parking pushing member 530 in the relative rotation around the axis until reaching the parking position.

The parking coil spring 540 under this elastically deformed state has an elastic force that urges the parking pushing member 530 in a direction to follow the drum member 140, at the stage where the engagement portion 515 and the parking concave/convex portion 112P are aligned, the parking operation arm 510 will be swung to the lock position against the urging force of the parking release spring 520 by the elastic force, and the engaging portion 515 and the parking concave/convex portion 112P will be engaged with each other in a concave-convex manner, achieving the parking gear (see FIG. 4B).

In the present embodiment, as shown in FIG. 4B, when the drum-type transmission device 1 is in an engagement state of the parking gear, in which the parking operation arm 510 is positioned at the lock position by the cam pushing portion 535, the reaction force acting on the cam pushing portion 535 from the pressure receiving surface 516 has a substantially opposite direction in which the cam pushing portion 535 extends radially outward with respect to the axis of the drum member 140 (Hereinafter, referred to as a "holding" configuration by the cam pushing portion 535).

By the "holding" configuration by the cam pushing portion 535, it is possible to effectively prevent or reduce the possibility for the concave-convex engagement between the engagement portion 515 of the parking operation arm 510 and the parking concave/convex portion 112P from being unintentionally released.

Specifically, in a case where the drum-type transmission device 1 is used in a travelling system transmission path of a working vehicle, the drum member 140 is positioned at a parking position while the working vehicle is located on a slope, and the drum-type transmission device 1 is in the engagement state of the parking gear.

In such a situation, gravity applied to the working vehicle is in reverse transmitted from the drive wheels to the transmission shaft 810, and a rotational driving force around the axis will be acted on the transmission shaft 810.

In general, the concave portion of the concave/convex engagement structure (the concave portion of the parking concave/convex portion 112P in the present embodiment) has a tapered shape that becomes narrower in width inward in the radial direction, and the convex portion (in the present embodiment, the engagement portion 515 of the parking operation arm 510) which is engaged with the concave portion has a tapered shaped cross section corresponding to the concave portion, thereby ensuring "easiness" of the concave/convex engagement.

On the other hand, since the cross section of the concave portion of the parking concave/convex portion 112P and the engagement portion 515 are tapered shaped, the following situation is assumable where when the reverse driving force is transmitted from the driving wheels to the transmission shaft 810, the reverse driving force will drive the parking operation arm 510 to swing in the parking release direction, which was originally located at the lock position will be unexpectedly pivoted in the parking release direction, rendering the concave-convex engagement between the parking operation arm 510 and the parking concave/convex portion 112P to be released.

In this regard, if the "holding" configuration by the cam pushing portion 535 makes it possible to effectively prevent or reduce the possibility for the parking operation arm 510 to unexpectedly swing from the lock position to the release direction.

Further, in the present embodiment, as shown in FIG. 4 and the like, the cam pushing portion 535 is not engaged with the parking operation arm 510, that is, the drum member 140 is positioned at an operation position within the range from the low-speed position to the reverse position, and the pushing member main portion 532 of the parking pushing member 530 abuts the parking operation arm 510 which is urged by the parking release spring 520 around the swing axis 505 in the parking release direction, and a swinging end of the parking operation arm 510 in the parking release direction is defined.

As shown in FIG. 3 and FIG. 4, the transmission operation shaft 150 is provided so as to penetrate the partition wall 805b of the transmission housing 805 and the shift gear chamber cover 806, and one end 150a of the transmission operation shaft 150 (the left end in the present embodiment) is disposed near the parking operation arm 510 inside the transmission housing 805. In the present embodiment, the transmission operation shaft 150 is provided at a position overlapping the parking operation arm 510 when viewed from the axial direction of the transmission operation shaft 150. An arm restraining portion 156 provided at the end 150a of the transmission operation shaft 150 is inserted into an engagement hole 517 provided in the arm portion 514 of the parking operation arm 510.

As shown in FIG. 4A and FIG. 4B, the arm restraining portion 156 is provided on an end surface of the end portion 150a of the transmission operation shaft 150, and projects toward and eccentrically with respect to the axis of the transmission operation shaft 150. In the present embodiment, the arm restraining portion 156 is formed by cutting out a part of a peripheral wall of the end portion 150a of the transmission operation shaft 150, and has a substantially fan-shaped column shape.

As shown in FIG. 4A, in the parking release state in which the parking operation arm 510 is located at the unlock position, the parking operation arm 510 is configured so as not to hinder the rotation of the transmission operation shaft 150 (rotational displacement of the arm restraining portion 156). In the present embodiment, the engagement hole 517 of the parking operation arm 510 has a form of a circular through hole having a diameter slightly larger than the shaft diameter of the transmission operation shaft 150, and is provided so as to substantially overlap the contour of the transmission operation shaft 150 when viewed from the axial direction of the transmission operation shaft 150 in the parking release state. Accordingly, when the transmission operation arm 155 is rotationally displaced between the reverse position R and the low-speed position L, the arm restraining portion 156 is prevented from contacting the inner peripheral wall of the engagement hole 517, therefore avoiding increasing the operation resistance to the transmission operation arm 155.

As shown in FIG. 4B, in the parking state where the parking operation arm 510 is located at the lock position, the engagement hole 517 is located at a position closer to the second shifter member 110L (parking gear) than in the parking release state (see FIG. 4A). When viewed from the axial direction of the transmission operation shaft 150, part of the inner peripheral wall of the engagement hole 517 intersects with the movement locus of the arm restraining portion 156 when the drum shaft 148 is rotated between the parking position and the reverse position.

The arm restraining portion 156 is configured so as to contact the inner peripheral wall of the engagement hole 517 when the transmission operation arm 155 rotates from the parking position P to the reverse position R (when the drum member 140 rotates from the parking position to the reverse position) and therefore capable of urging the parking operation arm 510 toward the unlock position.

According to the drum-type transmission device 1 of the present embodiment, when the drum member 140 rotates from the parking position to the shift position or the neutral position (the reverse position R in the present embodiment), the spring force of the parking release spring 520 and the lock release mechanism by the arm restraining portion 156 provided on the transmission operation shaft 150 will function, so that even if the parking state cannot be released only with the reaction force received by the parking operation arm 510 from the second shifter member 110L (parking gear) and the spring force of the parking release spring 520, the parking state will be reliably released by the operation of the arm restraining portion 156. Thereby, the reliability of the parking lock mechanism 500 in the drum-type transmission device 1 can be improved.

Further, by providing an arm restraining portion 156 on the transmission operation shaft 150 that is interlocked with the drum member 140 and the parking pushing member 530, two lock release mechanisms can be operated with one operation system (operation of the transmission operation shaft 150). That is, it is possible to provide a lock release mechanism by utilizing the arm restraining portion 156 other than including an additional operation system into an operation system that operates the rotation of the drum member 140 and the parking pushing member 530 by using the transmission operation shaft 150. The reliability of the parking lock mechanism 500 in the drum-type transmission device 1 can be improved with a simple configuration and at a low cost.

The arm restraining portion 156 is provided on the transmission operation shaft 150 which is located upstream of the rotational force transmission path for rotating the drum member 140. Accordingly, when the drum member 140 is rotated from the parking position to the shift position or the neutral position, the release operation force which is input to the transmission operation shaft 150 can be transmitted to the parking operation arm 510 without decreasing the force, and therefore suppressing distinctive increase in force.

Further, in the drum-type transmission device 1 of the present embodiment, the arm restraining portion 156 is formed by cutting out the end 150a of the transmission operation shaft 150, so that the arm restraining portion 156 can be provided to the transmission operation shaft 150 without increasing the number of parts. Therefore, the reliability of the parking lock mechanism 500 of the drum-type transmission device 1 can be improved at a low cost and with a compact configuration by avoiding a significant increase in the manufacturing cost.

When the parking lock is released, the arm restraining portion 156 may always urge the parking operation arm 510 toward the unlock position, or alternatively it may urge the parking operation arm 510 toward the unlock position only when the parking operation arm 510 does not separate from the parking concave/convex portion 112P even if the cam pushing portion 535 of the parking pushing member 530 is separated from the parking operation arm 510.

The form of the arm restraining portion 156 is not limited to a substantially fan-shaped column, but may be another form such as a circular column. Instead of the arm restraining portion 156 being formed by cutting out a portion of the transmission operation shaft 150, an arm restraining portion may alternatively be formed by attaching a separate member which is capable of urging the parking operation arm 510 toward the unlock position, when the drum member 140 is moved from the parking position to the shift position or the neutral position, at the end 150a of the transmission operation shaft 150.

Further, the engagement hole 517 of the parking operation arm 510 with which the arm restraining portion 156 contacts is not limited to a circular shape, and may be other shapes such as an L-shaped groove, or it may be open to the outer peripheral side surface of the parking operation arm 510. The position on the parking operation arm 510 where the arm restraining portion 156 comes into contact with is arranged within the area between the parking operating arm 510 and the second shifter member 110L (parking gear) and may acceptably be the portion of the outer peripheral side surface of the parking operation arm 510 facing the second shifter member 110L.

Next, another embodiment of the drum-type transmission device will be described with reference to FIG. 5. In the present embodiment, in the parking lock mechanism 500A, the shape and position of the arm restraining portion 156A in the transmission operation shaft 150 and the shape and position of the engagement hole 517A in the parking operation arm 510 are different from those of the above embodiment described with reference to FIG. 1 to FIG. 4. The configuration of the other parts are the same as that of the above-described embodiment described with reference to FIG. 1 to FIG. 4, and a detailed description thereof is therefore omitted.

In the embodiment shown in FIG. 5, when the drum member 140 is positioned at the parking position (when the transmission operation arm 155 is positioned at the parking position P), the arm restraining portion 156A and the engagement hole 517A are so configured so as to restrict the movement of the parking operation arm 510 to the unlock position.

The arm restraining portion 156A is provided on an end surface of the end 150a of the transmission operation shaft 150, and protrudes toward and eccentrically with respect to the axis of the transmission operation shaft 150. In the present embodiment, the arm restraining portion 156A is formed by cutting out a part of a peripheral wall of the end portion 150a of the transmission operation shaft 150, and has a substantially fan-shaped column shape.

Figure 5A:
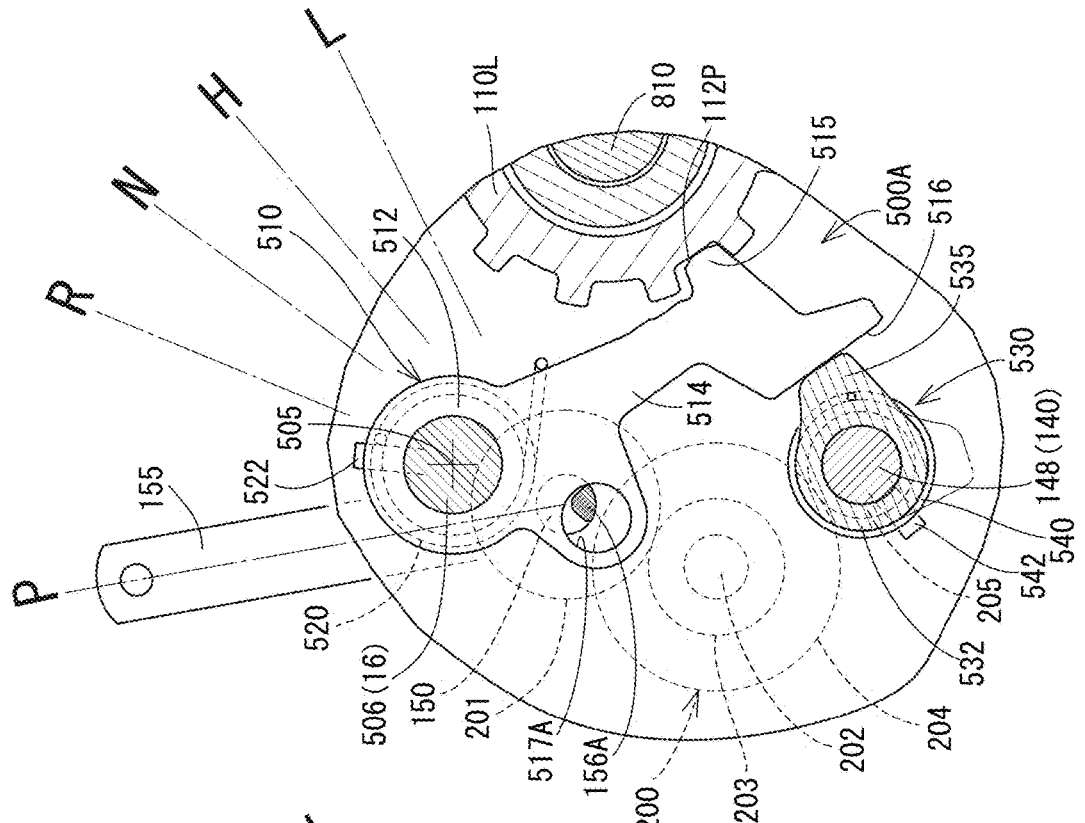

As shown in FIG. 5A, in the parking release state in which the parking operation arm 510 is located at the unlock position, the parking operation arm 510 is configured so as not to hinder the rotation of the transmission operation shaft 150 (rotational displacement of the arm restraining portion 156) within the range in which the transmission operation arm 155 is rotated between the reverse position R and the low-speed position L.

In the present embodiment, the engagement hole 517A of the parking operation arm 510 has a form of a circular through hole having a diameter slightly larger than the shaft diameter of the transmission operation shaft 150. In the parking release state, as viewed from the axial direction of the transmission operation shaft 150, the inner peripheral wall of the engagement hole 517A intersects with the movement locus of the arm restraining portion 156A when the drum shaft 148 is rotated between the parking position and the reverse position (when the transmission operation arm 155 is rotated between the parking position P and the reverse position R), whereas on the other hand it does not intersect with the movement locus of the arm restraining portion 156A when the drum shaft 148 is rotated between the reverse position and the low-speed position (when the transmission operation arm 155 is rotated between the reverse position R and the low-speed position L). Thereby, when the transmission operation arm 155 is rotationally displaced between the reverse position R and the low-speed position L, the arm restraining portion 156A is prevented from contacting the inner peripheral wall of the engagement hole 517A, therefore avoiding increasing the operation resistance to the transmission operation arm 155.

Figure 5B:
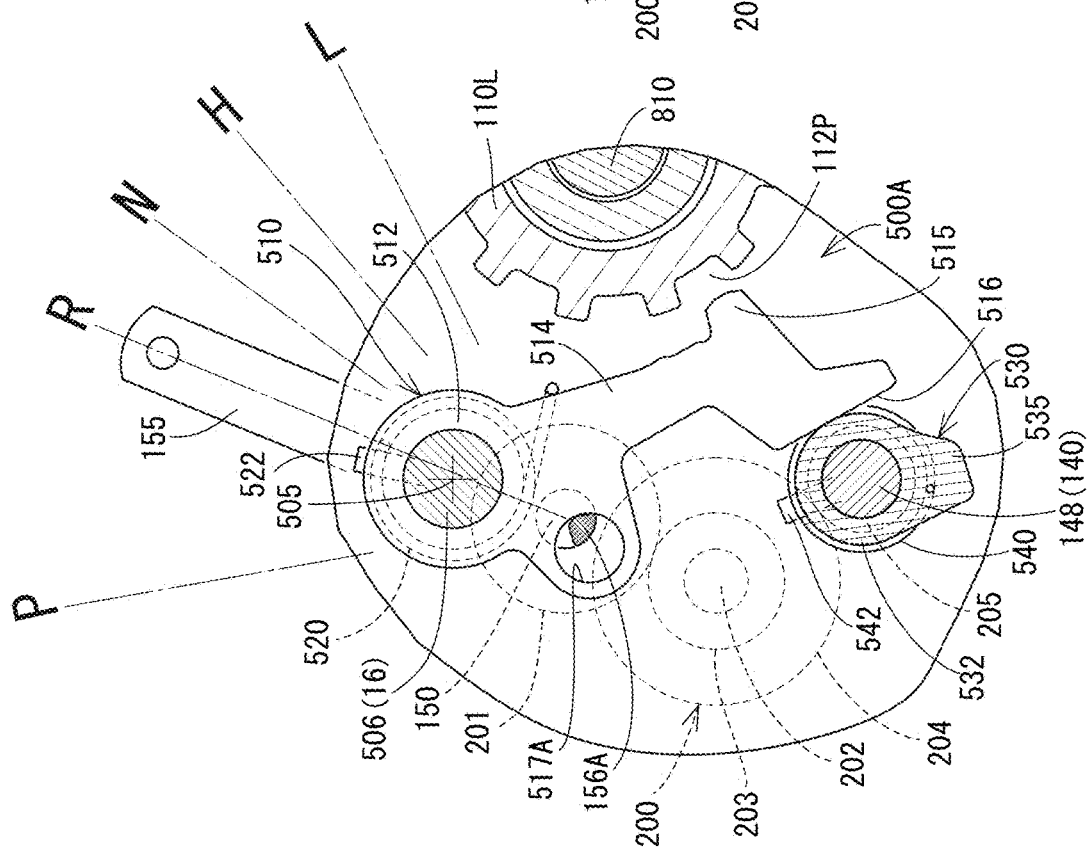

As shown in FIG. 5B, in the parking state where the parking operation arm 510 is located at the lock position, the arm restraining portion 156A is disposed at a position that restricts the movement of the parking operation arm 510 toward the unlock position. In the present embodiment, the engagement hole 517A is located at a position closer to the second shifter member 110L (parking gear) than in the parking release state (see FIG. 5A), and the end of the arm restraining portion 156A which is in a nearer position to the second shifter member 110L (parking gear) is disposed close to the inner peripheral wall of the engagement hole 517A when viewed from the axial direction of the transmission operation shaft 150.

The parking lock mechanism 500A according to the present embodiment is a locking mechanism that restricts the movement of the parking operation arm 510 toward the unlock position when the drum member 140 is at the parking position, comprises a lock mechanism using the parking pushing member 530 and a lock mechanism using the arm restraining portion 156A. As described above, by having two lock mechanisms provided on separate members, even does occur such a situation where one of the lock mechanisms fails, the other lock mechanism can maintain the parking state, and the reliability of the parking lock mechanism 500A is improved.

Further, in the parking lock mechanism 500A, by providing the arm restraining portion 156A on the transmission operation shaft 150 that is interlocked with the drum member 140 and the parking pushing member 530, the two lock mechanisms can be operated by one operation system. In other words, a lock mechanism using the arm restraining portion 156A can be provided without adding an additional operation system to an operation system that operates the rotation of the drum member 140 and the parking pushing member 530 using the transmission operation shaft 150. The reliability of the parking lock mechanism 500A can be improved with a simple configuration and at a low cost.

Further, in the drum-type transmission device 1 of the present embodiment, the arm restraining portion 156A is formed by cutting out the end 150a of the transmission operation shaft 150, so that the arm restraining portion 156A can be provided to the transmission operation shaft 150 without increasing the number of parts. Therefore, the reliability of the parking lock mechanism 500A in the drum-type transmission device 1 can be improved at a low cost and with a compact configuration by avoiding a significant increase in the manufacturing cost.

The arm restraining portion 156A may or may not be in contact with the parking operation arm 510 during parking lock. That is, the arm restraining portion 156A comes into contact with the parking operation arm 510 only when the parking pushing member 530 cannot maintain the parking operation arm 510 in the lock position even though the drum member 140 is in the parking position. The movement of the parking operation arm 510 toward the unlock position may be restricted so that the parking operation arm 510 does not separate from the parking concave/convex portion 112P.

The form of the arm restraining portion 156A is not limited to a substantially fan-shaped column, but may be another form such as a circular column. Further, instead of the arm restraining portion 156A being formed by cutting out a portion of the transmission operation shaft 150, an arm restraining portion may alternatively be formed by attaching a separate member which restricts the movement of the parking operation arm 510 toward the unlock position, when the drum member 140 is located at the parking position, at the end 150a of the transmission operation shaft 150.

Further, the engagement hole 517A of the parking operation arm 510 with which the arm restraining portion 156A contacts is not limited to a circular shape, and may be other shapes such as an L-shaped groove, or it may be open to the outer peripheral side surface of the parking operation arm 510. The position on the parking operation arm 510 where the arm restraining portion 156A comes into contact with is arranged within the area opposite to the second shifter member 110L (parking gear) with respect to the parking operation arm 510 and may acceptably be the portion of the outer peripheral side surface of the parking operation arm 510 opposite to the second shifter member 110L.

Figure 6A:
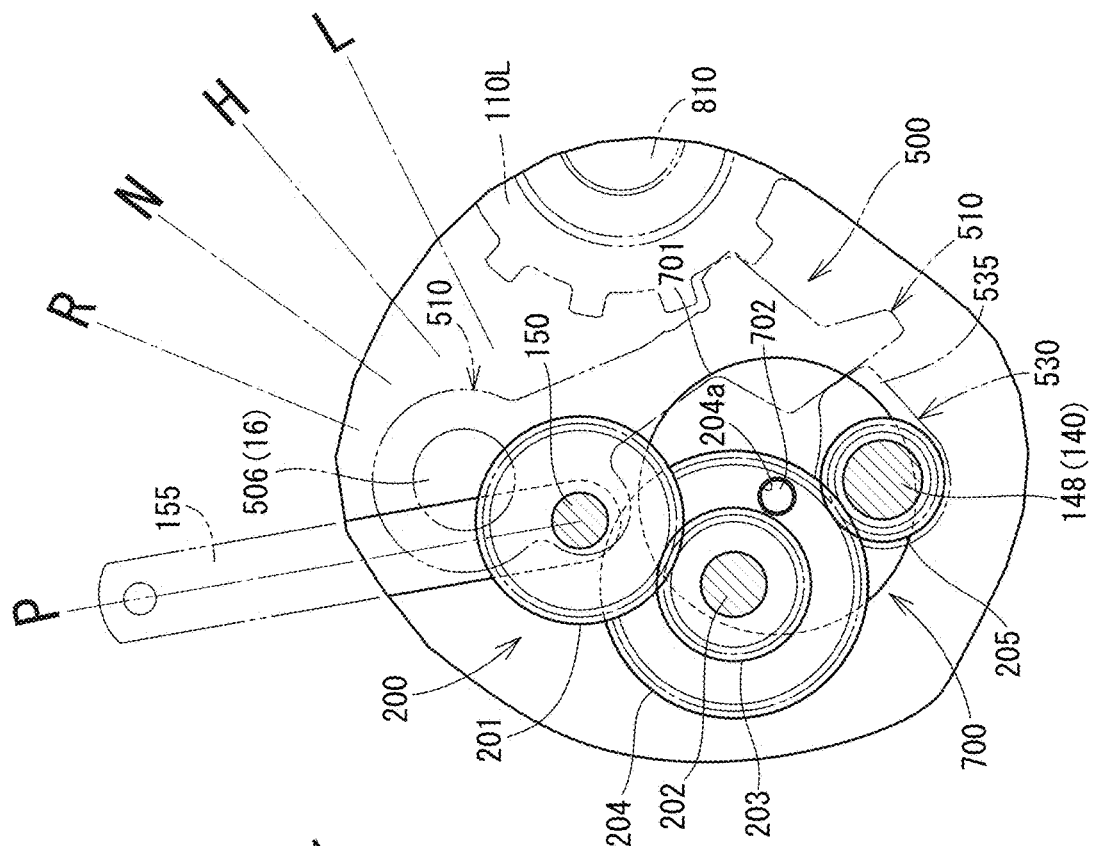
Figure 6B:
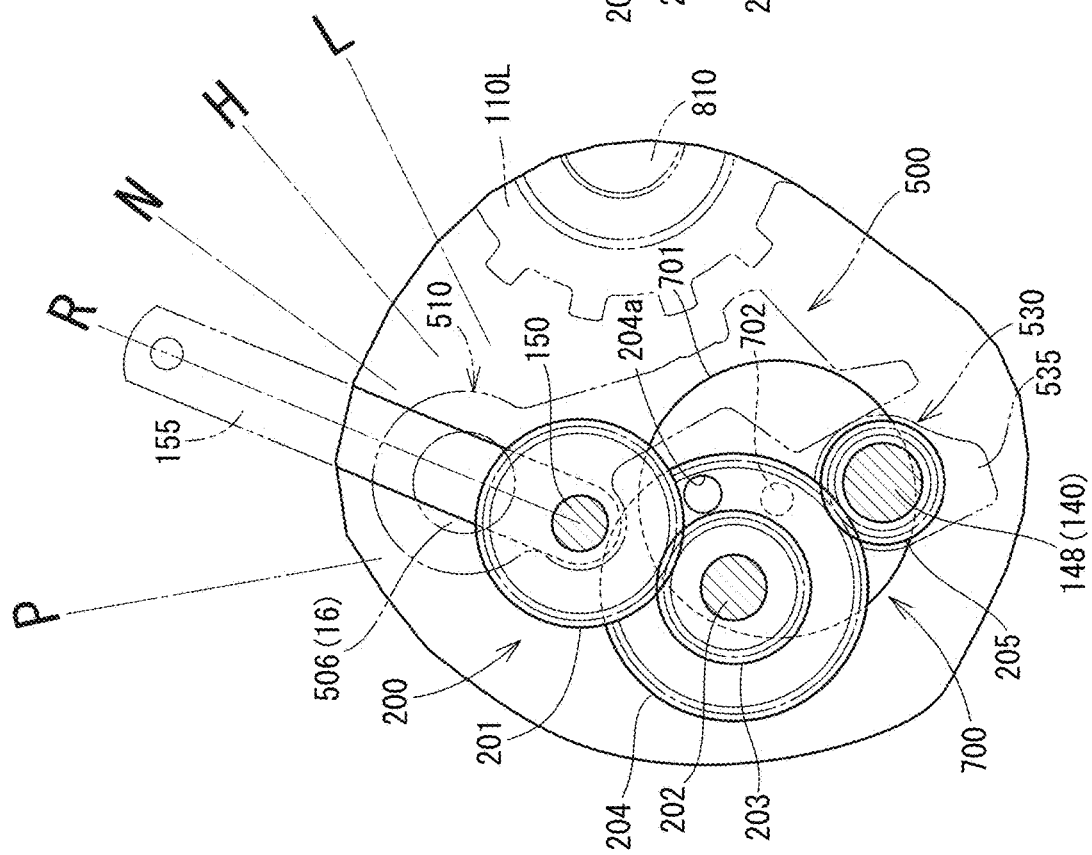
Figure 7:
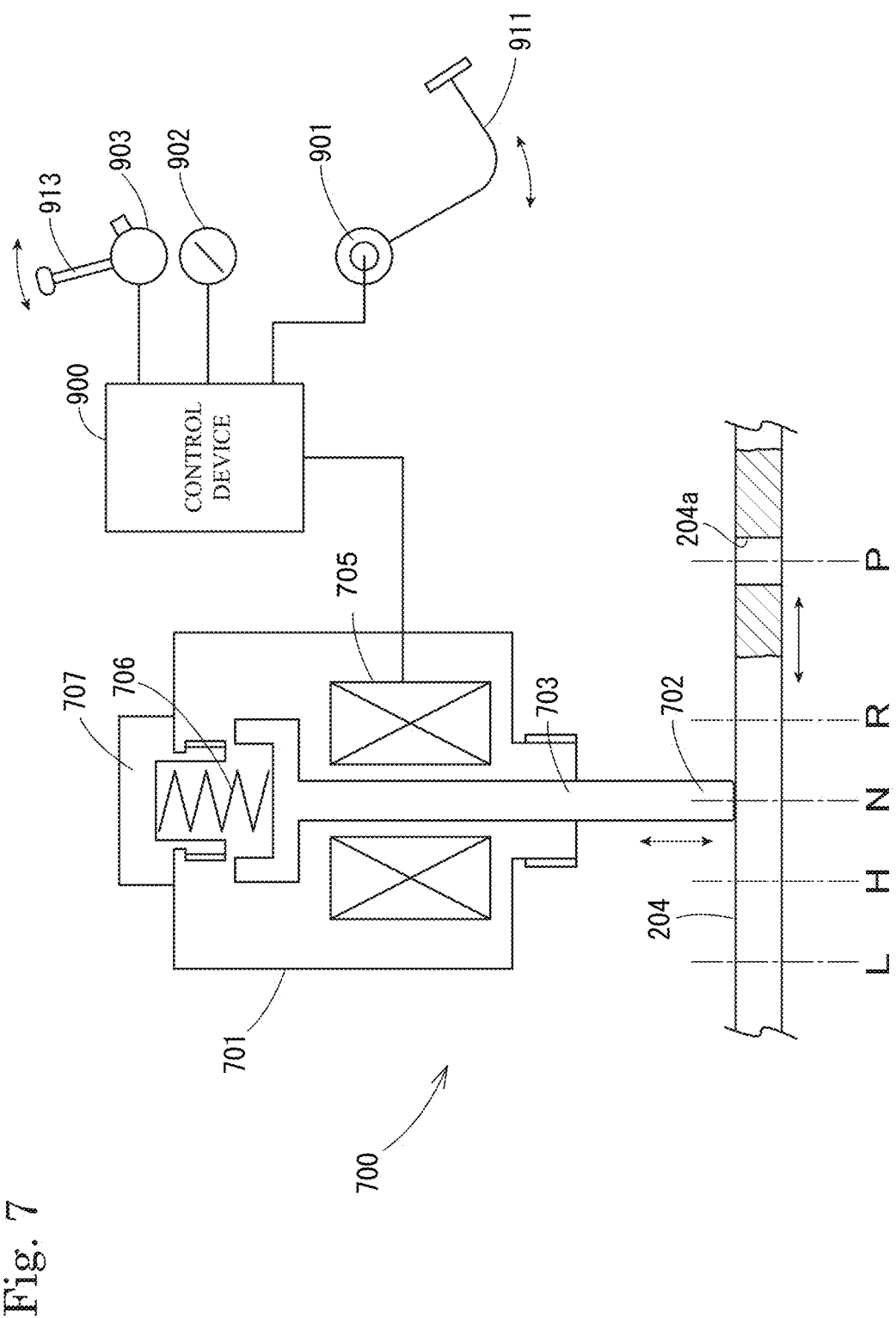
FIG. 7 is a configuration diagram schematically showing a parking lock holding mechanism and a control system thereof.

Next, the parking lock holding mechanism 700 will be described with reference to FIG. 3, FIG. 6, and FIG. 7. FIG. 6 is a cross-sectional view corresponding to the position BB in FIG. 3, wherein (A) shows a released parking state, and (B) shows a parking state. FIG. 7 is a diagram schematically showing a parking lock holding mechanism 700 and a control system thereof. In FIG. 3, the second shift idle gear 204 of the shift gear train 200 is shown in a cross section along the lock member engagement portion 204a. In FIG. 6, the transmission housing 805 and the shift gear chamber cover 806 are not shown.

As shown in FIG. 3, a parking lock holding mechanism 700 is provided on a shift gear chamber cover 806 which is attached to the transmission housing 805. When the drum member 140 is located at the parking position (when the transmission operation arm 155 is at the parking position P), with the plurality of shift gears 201, 203, 204, 205 constituting the shift gear train 200, and in the present embodiment the gear lock member 702 is engaged with the lock member engagement portion 204a that is provided on the second shift idle gear 204, the parking lock holding mechanism 700 is so provided as to inhibit the rotation of the shift gear 204.

The parking lock holding mechanism 700 comprises a solenoid 701 as an example of an electric actuator that slides the gear lock member 702 in a direction in which the gear lock member 702 is engaged with and disengaged from the lock member engagement portion 204a. The solenoid 701 is attached to the outer surface of the shift gear chamber cover 806 such that the gear lock member 702 that is provided at the distal end of the plunger 703 faces the side surface of the second shift idle gear 204 in the shift gear chamber 805a. In the present embodiment, the distal end of the plunger 703 itself constitutes the gear lock member 702. Alternatively, it is also acceptable to provide a separate member capable of engaging with the lock member engagement portion 204a at the distal end of the plunger 703 as a gear lock engagement member.

As shown in FIG. 7, the solenoid 701 is a so-called pull solenoid which the plunger 703 retracts when the coil 705 is energized (attracted in a direction away from the second shift idle gear 204), the elastic force of the elastic member 706 urges the plunger 703 in the protruding direction when the coil 705 is de-energized. That is, the solenoid 701 comprises the plunger 703 that linearly moves in a direction in which a gear lock member 702 that is provided at the distal end is engaged with and disengaged from the lock member engagement portion 204a, and is configured such as when the coil 705 of the solenoid 701 is de-energized, the gear lock member 702 that is provided at the distal end of the plunger 703 is biased in a direction in which the gear lock member 702 engages with the lock member engagement portion 204a.

As shown in FIG. 6 and FIG. 7, in the parking lock holding mechanism 700, when the drum member 140 is at the parking position (when the transmission operation arm 155 is at the parking position P), the lock member engagement portion 204a that is provided on the second shift idle gear 204 of the shift gear train 200 is configured to be located on the movement locus of the gear lock member 702 (on the axis of the plunger 703). When the drum member 140 is in the parking position and the coil 705 of the solenoid 701 is not energized, the gear lock member 702 that is provided at the distal end of the plunger 703 is inserted into and engaged with the lock member engagement portion 204a, and the rotation of the second shift idle gear is inhibited. As a result, the rotation of the shift gear train 200 and further the rotation of the drum member 140 is inhibited, and the parking state by the parking lock mechanism 500 is therefore maintained.

When the drum member 140 is located at an operation position other than the parking position, the gear lock member 702 is pressed against a portion other than the lock member engagement portion 204a on the side surface of the second shift idle gear 204 by the elastic force of the elastic member 706. When the drum member 140 is at the parking position, the gear lock member 702 is in a standby state in which it can immediately engage with the lock member engagement portion 204a.

As shown in FIG. 7, the operation of the parking lock holding mechanism 700 is controlled by a control device 900 which is provided on a vehicle on which the drum-type transmission device 1 is mounted. The control device 900 comprises a CPU (Central Processing Unit) that executes various arithmetic processes and controls, a ROM (Read Only Memory) that stores a control program and various data, and a RAM (Random Access Memory) that temporarily stores the control program and various data, an input interface, and the like.

The input side of the control device 900 is electrically connected to a brake sensor 901 which is configured to operate a brake operation tool 911 such as a pedal or a lever for performing a braking operation on a vehicle wheel, and to an ignition switch 902 which is configured to turn on or off an electric system of the vehicle and to an operation position detection sensor 903 which is configured to detect the operation position of the drum member 140. A potentiometer sensor or the like can be adopted as the operation position detection sensor 903 is provided, for example, near the seat of the vehicle, and detects a shift position of a shift lever 913 that interlocked to the drum member 140, and detects a rotation angle of the drum shaft 148 of the drum member 140.

The solenoid 701 is electrically connected to the output side of the control device 900. Although not shown in FIG. 7, various other sensors and driving devices are electrically connected to the control device 900.

Figure 8:
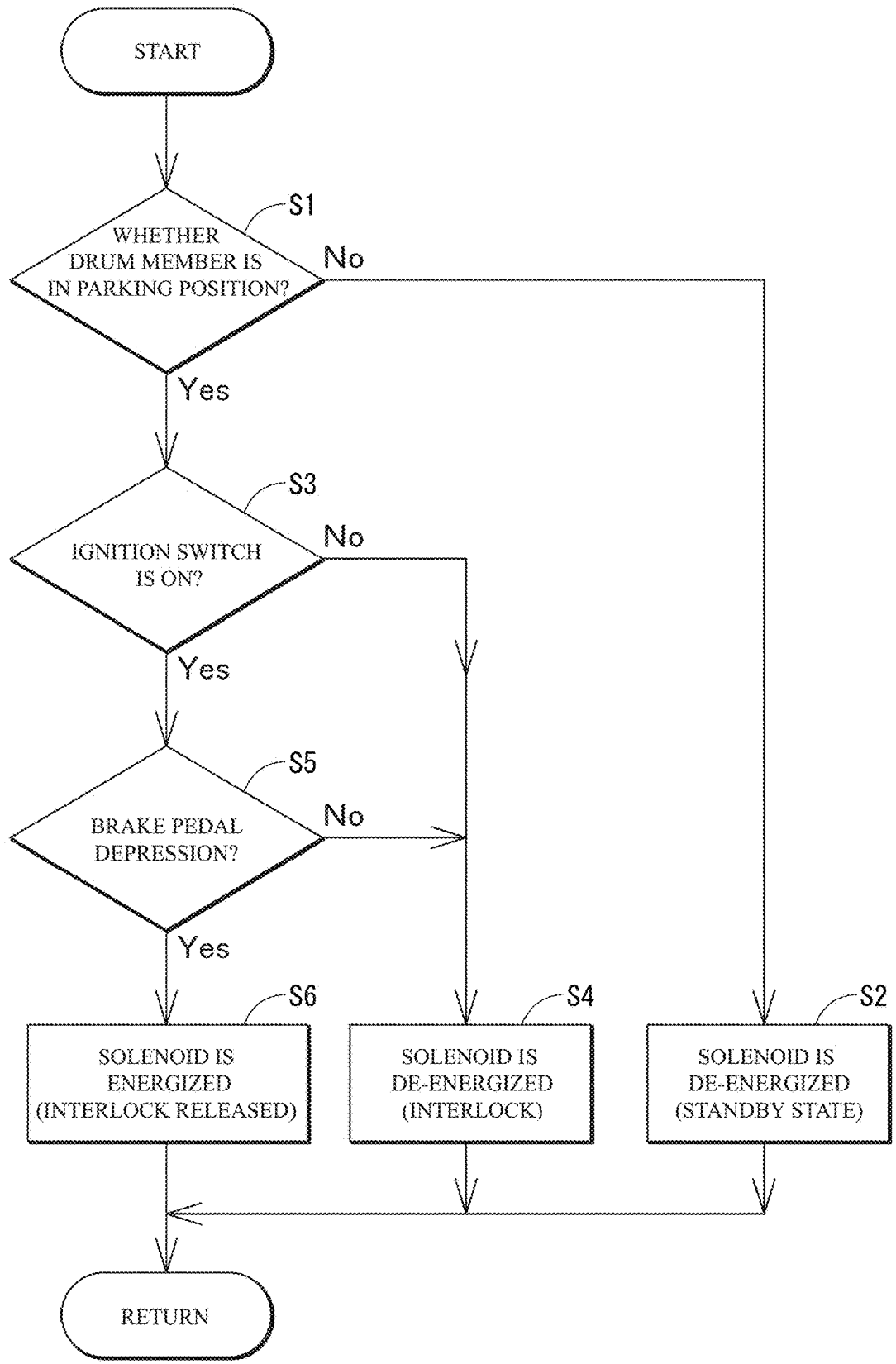
FIG. 8 is a flowchart for explaining the operation of the parking lock holding mechanism.

The operation of the parking lock holding mechanism 700 will be described with reference to FIG. 8. FIG. 8 is a flowchart for explaining the operation of the parking lock holding mechanism 700.

The parking lock holding mechanism 700 is configured such that when the drum member 140 is located at an operation position other than the parking position (Step S1, No), the solenoid 701 is de-energized (Step S2) regardless of the on/off state of the ignition switch 902. At this time, as described above, when the drum member 140 is at the parking position, the gear lock member 702 is in a standby state in which the gear lock member 702 can immediately engage with the lock member engagement portion 204*a*.

When the drum member 140 is in the parking position (the shift lever 913 is in the parking position) (Step S1, Yes) and when the ignition switch 902 is off (Step S3, No), since no power is supplied to the solenoid 701 of the parking lock holding mechanism 700, the coil 705 is in a de-energized state (Step S4). At this time, the gear lock member 702 is engaged with the lock member engagement portion 204*a* by the elastic force of the elastic member 706, and the parking lock holding mechanism 700 enters an interlock state where the shift lever 913 cannot be operated.

When the drum member 140 is in the parking position (Step S1, Yes), the ignition switch 902 is turned on (Step S3, Yes), and once the brake operation tool 911 is operated (or operates), causing the control device 900 to determine based on the detection signal of the brake sensor 901 (Step S5, Yes), the coil 705 of the solenoid 701 is energized due to the control of the control device 900 (Step S6). As a result, the plunger 703 is sucked rendering the gear lock member 702 to be pulled out from the lock member engagement portion 204*a*, and the parking lock holding mechanism 700 enters an interlock release state in which the shift lever 913 can be operated.

After the parking lock holding mechanism 700 performs the interlock release operation, when the shift lever 913 is operated to move the drum member 140 to an operation position other than the parking position (Step S1, No), the coil 705 of the solenoid 701 is turned de-energized due to the control of the control device 900, and the parking lock holding mechanism 700 enters a standby state (Step S2).

In addition, the solenoid 701 is configured so that the protrusion amount of the plunger 703 can be adjusted by rotating the manual release screw 707. By rotating the manual release screw 707 so that the plunger 703 is retracted in a state where the gear lock member 702 of the plunger 703 is inserted and engaged with the lock member engagement portion 204*a* of the second shift idle gear 204, and therefore the engagement between the gear lock member 702 and the lock member engagement portion 204*a* (shift gear locked state) can be released. Thus, even when power cannot be supplied to the solenoid 701 due to, for example, running out of a battery, the gear lock member 702 can be manually pulled out of the lock member engagement portion 204*a* to make the shift gear train 200 operable and renders the shift lever 913 operatable.

In the present embodiment, the parking lock holding mechanism 700 is configured so that when the drum member 140 is at the parking position (when the transmission operation arm 155 is at the parking position P), the gear lock member 702 is engaged with the lock member engagement portion 204*a* that is provided on the second shift idle gear 204 of the shift gear train 200 so that the rotation of the second shift idle gear 204 can be inhibited. Accordingly, it can be prevented for the shift lever 913 that is provided on the vehicle from being unexpectedly operated avoiding the parking state being released during parking of the vehicle on which the drum-type transmission device 1 is mounted.

Further, the parking lock holding mechanism 700 comprises the solenoid 701 (an example of an electric actuator) that slides the gear lock member 702 in a direction in which the gear lock member 702 is disengaged from the lock member engagement portion 204*a*, and is configured so that when the solenoid 701 is de-energized, the gear lock member 702 is urged in a direction to engage with the lock member engagement portion 204*a*. Thus, with just a simple configuration of the solenoid 701, even at the time when the power supply to the solenoid 701 cannot be performed due to, for example, running out of a battery, the gear lock member 702 is engaged with the lock member engagement portion 204*a* so that the operation of the shift gear train 200 can be reliably inhibited when the drum member 140 is at the parking position.

Furthermore, since the electric actuator comprises the solenoid 701 having a plunger 703 that makes linear movement, and the gear lock member 702 is provided at the distal end of the plunger 703, the parking lock holding mechanism 700 can be realized with a simple configuration, while an increase in manufacturing cost can be suppressed.

Further, the vehicle according to the present embodiment comprises a control device 900 which is configured so that, when the brake operation tool 911 for braking the wheels is operated, the ignition switch 902 is turned on, and the drum member 140 is positioned to the parking position as the operation position, the solenoid 701 is operated to release the engagement of the gear lock member 702 with the lock member engagement portion 204*a*. This way, under a state where the vehicle is executable but is stopped reliably, the interlocked state (the gear lock member 702 is engaged with the lock member engagement portion 204*a* and the shift lever 913 of the vehicle is rendered non-operatable) of the parking lock holding mechanism 700 can be released, and the vehicle can be prevented from moving immediately after the rotation of the drum member 140 from the parking position to another operation position.

Figure 9:
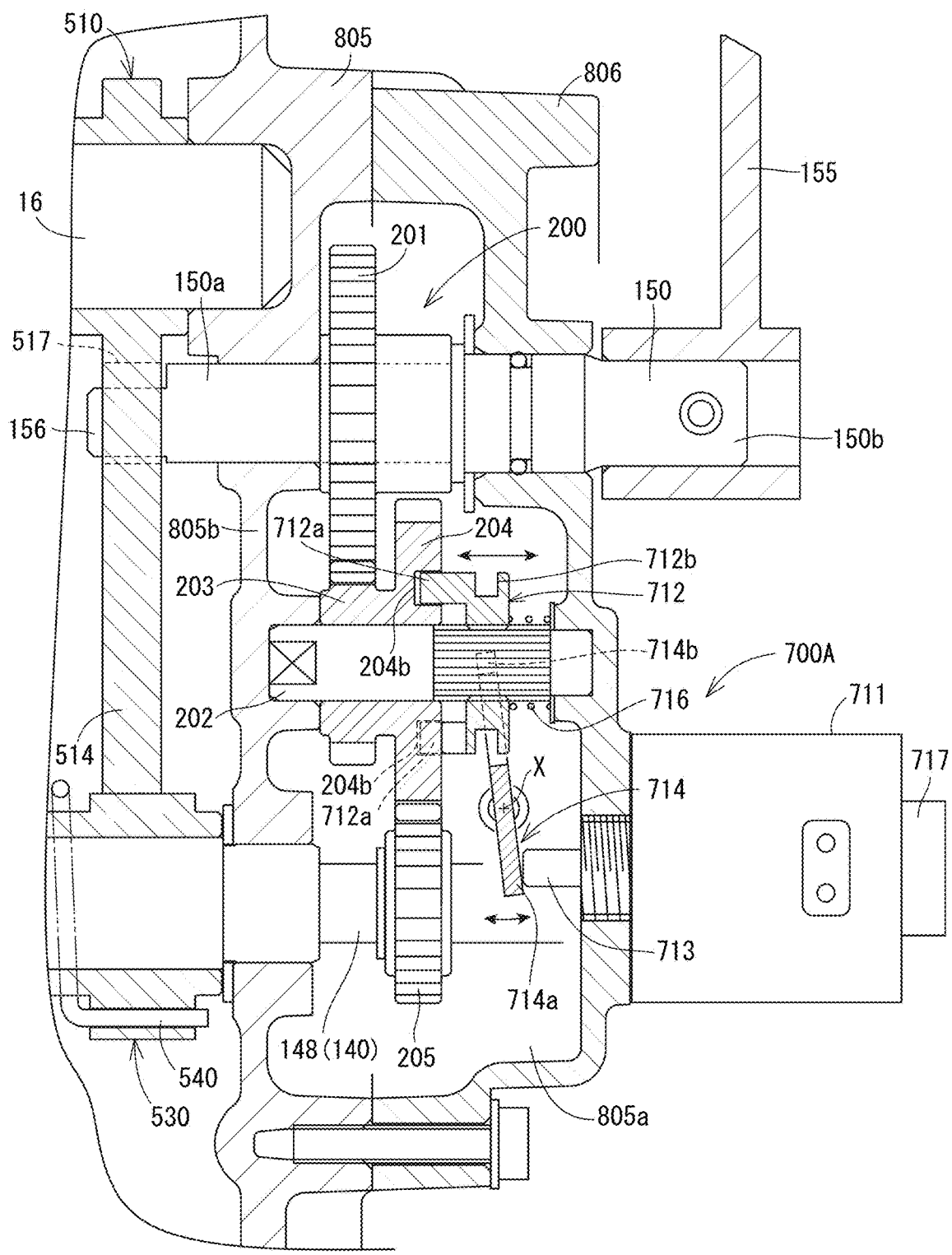
FIG. 9 is a sectional view showing a modification of the parking lock holding mechanism.

Next, an embodiment variant of the drum-type transmission device 1 using the parking lock holding mechanism 700A will be described with reference to FIG. 9. In the present embodiment, the parking lock holding mechanism 700A is configured such as two lock member engagement portions 204*b* are provided on the second shift idle gear 204 of the shift gear train 200, to which two engagement protrusions 712*a* of the gear lock member 712 are detachably engaged with and are provided in such a manner as are non-rotatable relative to the shift idle shaft 202 but are slidable in the axial direction, and the rotation of the second shift idle gear 204 is inhibited.

The parking lock holding mechanism 700 comprises a solenoid 711 as an example of an electric actuator that slides the gear lock member 712 in a direction in which the gear lock member 712 is disengaged from the lock member engagement portion 204b. The solenoid 711 is configured so that the plunger 713 is projected to push against a proximal end 714a of a swing member 714 that is provided to be swingable about a swing axis X orthogonal to the sliding direction of the gear lock member 712 (the axial direction of the shift idle shaft 202), resulting in that the gear lock member 712 that is connected to another free end 714b of the swing member 714 can be moved in a direction away from the second shift idle gear 204.

The free end 714b of the swing member 714 is formed in a substantial C shape so as to sandwich the gear lock member 712, and the inward claw portion of the free end 714b of the swing member 714 is inserted in an irremovable manner into an engagement groove 712b provided on the outer peripheral surface of the substantially cylindrical shaped gear lock member 712.

The two ends of the shift idle shaft 202 are respectively non-rotatably fixed to the partition 805b of the transmission housing 805 and the shift gear chamber cover 806. That is, the gear lock member 712 provided on the shift idle shaft 202 so as to be relatively non-rotatable but slidable in the axial direction is held non-rotatably with respect both to the transmission housing 805 and to the shift gear chamber cover 806. An elastic member 716 that biases the gear lock member 712 toward the second shift idle gear 204 is extrapolated to the shift idle shaft 202 at a position within the range between the gear lock member 712 and the shift gear chamber cover 806.

The solenoid 711 is a so-called push solenoid in which the plunger 713 protrudes when a coil (not shown) is energized, while when the coil is de-energized, due to the elastic force of elastic member 716 the plunger 713 is pushed and becomes retracted to proximal end 714a of the swing member 714 which is located near to the solenoid 711.

When the solenoid 711 is energized, the plunger 713 protrudes and pushes the proximal end 714a of the swing member 714 so as to move the gear lock member 712 away from the second shift idle gear 204 against the elastic force of the elastic member 716.

In the parking lock holding mechanism 700A, when the drum member 140 is at the parking position (when the transmission operation arm 155 is at the parking position P), the two lock member engagement portions 204b that are provided on the second shift idle gear 204 of the shift gear train 200 are configured to be located on the movement locus of the corresponding engagement protrusions 712a of the gear lock member 712. When the drum member 140 is at the parking position and the coil 705 of the solenoid 701 is not energized, the engagement protrusion 712a is inserted into and engaged with the lock member engagement portion 204b, and the rotation of the second shift idle gear 204 is inhibited. As a result, the operation of the shift gear train 200 is inhibited, and thus the rotation of the drum member 140 is inhibited, and the parking state by the parking lock mechanism 500 is maintained.

When the drum member 140 is located at an operation position other than the parking position, the engagement protrusion 712a of the gear lock member 712 is in a state of being detached from the lock member engagement portion 204b, and the engagement protrusion 712a is pressed to a portion other than the lock member engagement portion 204b on the side surface of the second shift idle gear 204, and when the drum member 140 is at the parking position, the engagement protrusion 712a immediately enters a standby state in which it can be engaged with the lock member engagement portion 204b.

The solenoid 711 of the parking lock holding mechanism 700A performs the same operation as that of the parking lock holding mechanism 700 of the above embodiment by the control device 900 shown in FIG. 7 according to the flowchart shown in FIG. 8.

Further, the solenoid 711 is configured so that the protrusion amount of the plunger 713 can be adjusted by rotating the manual release screw 717. In a state where the gear lock member 712 of the plunger 713 is inserted into and engaged with the lock member engagement portion 204b, the manual release screw 717 is rotated for the plunger 713 to protrude more, so that the engagement of the gear lock member 712 with the lock member engagement member 204b (shift gear lock state) can be released. Thus, even when power cannot be supplied to the solenoid 711 due to, for example, running out of battery, the gear lock member 712 can be manually pulled out of the lock member engagement portion 204b to make the shift gear train 200 operable and further renders shift lever 913 operatable.

In the present embodiment, the parking lock holding mechanism 700A is configured so that when the drum member 140 is at the parking position (when the transmission operation arm 155 is at the parking position P), the gear lock member 702 is engaged with the lock member engagement portion 204b that is provided on the second shift idle gear 204 of the shift gear train 200 so that the rotation of the second shift idle gear 204 can be inhibited. Accordingly, it can be prevented for the shift lever 913 that is provided on the vehicle from being unexpectedly operated avoiding the parking state from being released during parking of the vehicle on which the drum-type transmission device 1 is mounted.

Further, the parking lock holding mechanism 700A comprises the solenoid 711 (an example of an electric actuator) that slides the gear lock member 712 in a direction in which the gear lock member 712 is disengaged from the lock member engagement portion 204b, and is configured so that when the solenoid 701 is de-energized, the engagement protrusion 712a of the gear lock member 712 is urged toward the direction in which the engagement protrusion 712a engages with the lock member engagement portion 204b. Thus, with just a simple configuration of the solenoid 711, even at the time when power cannot be supplied to the solenoid 711 due to, for example, running out of a battery, the gear lock member 712 is engaged with the lock member engagement portion 204a so that the operation of the shift gear train 200 can be reliably inhibited when the drum member 140 is at the parking position.

Figure 10:
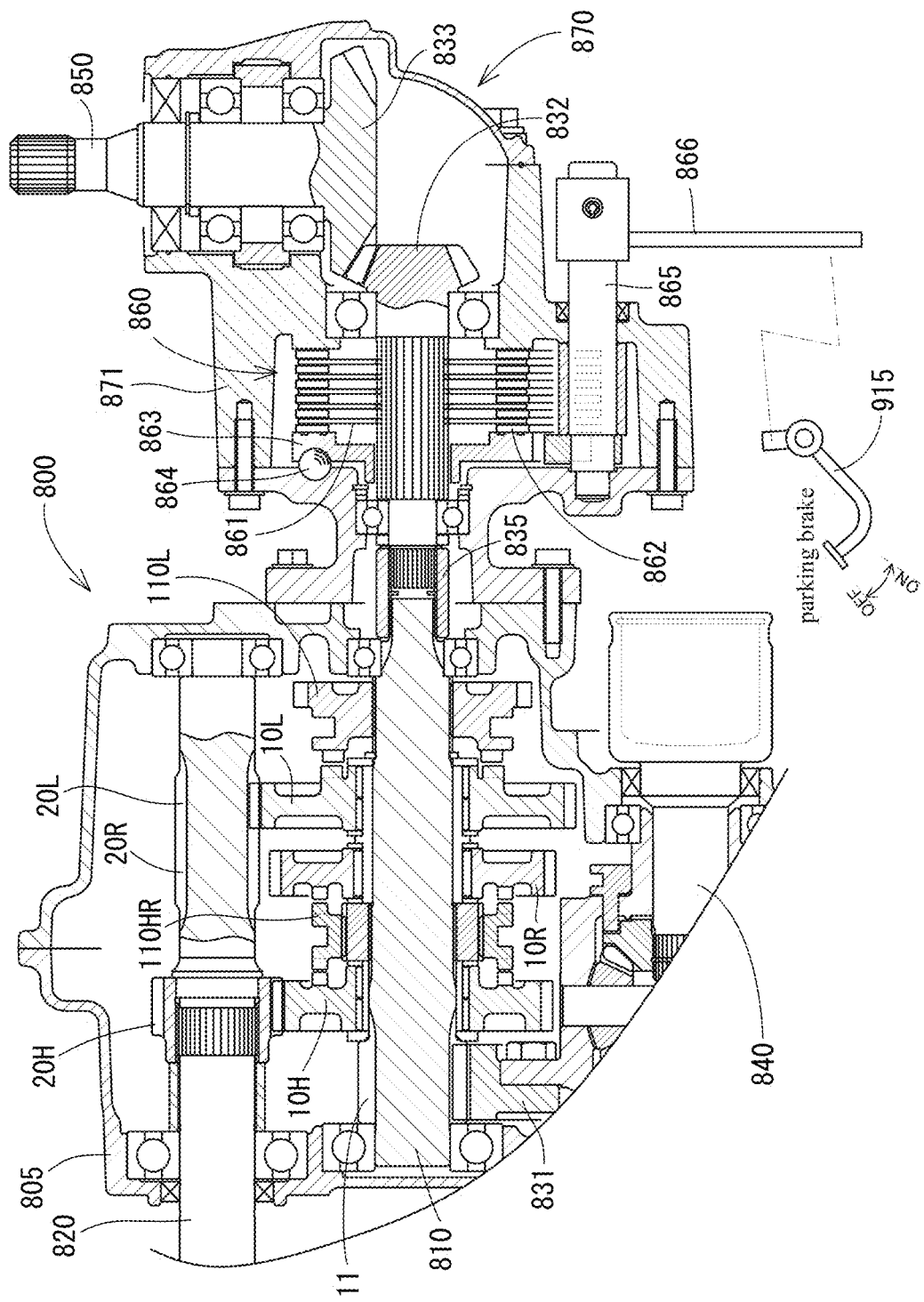
FIG. 10 is a schematic plan view of an embodiment further comprising a parking brake, which extends in the direction to which the axles of a transmission shaft, a power input shaft, a rear wheel output shaft, and a front wheel output shaft are parallel.

The embodiment of a transmission comprising a parking brake mechanism will be described with reference to FIG. 10 and FIG. 11. In this embodiment, the transmission 800 comprises a parking brake mechanism 860, in the power take-out case 871 housing the power take-out device 870, which is configured to operate in conjunction with the operation of a parking brake operation tool 915 which consists of a lever or a pedal provided for example, in the vicinity of the seat in the vehicle. The other configurations of the transmission 800 comprising the parking brake mechanism 860 may be realized the same as the above-mentioned embodiments described with reference to FIG. 1 to FIG. 8.

The parking brake mechanism 860 consists of a wet disc brake device which is assembled in the power take-out device 870. In the parking brake mechanism 860, alternatively provided are at least one friction plate 861 that is supported to the rotation shaft to be braked (in this embodiment, the drive bevel gear 832, which is connected to the transmission shaft 810 in a relatively non-rotatable manner via a coupling 835) in the power take-out case 871, and at least two mating plates 862 that are supported to the power take-out case 871. The parking brake mechanism 860 comprises a pressure plate 863 that is provided opposite to the mating plate 862 positioned at one end. The pressure plate 863, under rotational displacement operation, is displaced to the side of the mating plates 862 by a cam device (wrecking ball) 864 and pushes against the mating plate 862 positioned at one end causing frictional engagement between the friction plate 861 and the mating plates 862. This way, the parking brake mechanism 860 is capable of braking operation of the transmission shaft 810. A parking brake operation shaft 865 which operates the pressure plate 863 is connected to the parking brake operation tool 915 via a parking brake operation arm 866.

When the parking brake operation tool 915 is at an on-position, the parking brake mechanism 860 functions in the way that, by pressing the mating plate 862 toward the friction plate 861, the rotation of the drive bevel gear 832 is braked and the rotation of the transmission shaft 810 that is connected to the drive bevel gear 832 in a relatively non-rotatable manner is therefore braked, leading to the braking operation of the rear wheels 4 and the front wheels 6 of the vehicle 1000 (FIG. 1). On the other hand, when the parking brake operation tool 915 is at an off-position, the parking brake mechanism 860 allows the rotation of the drive bevel gear 832 and the transmission shaft 810 with the mating plate 862 being positioned away from the friction plate 861.

Figure 11:
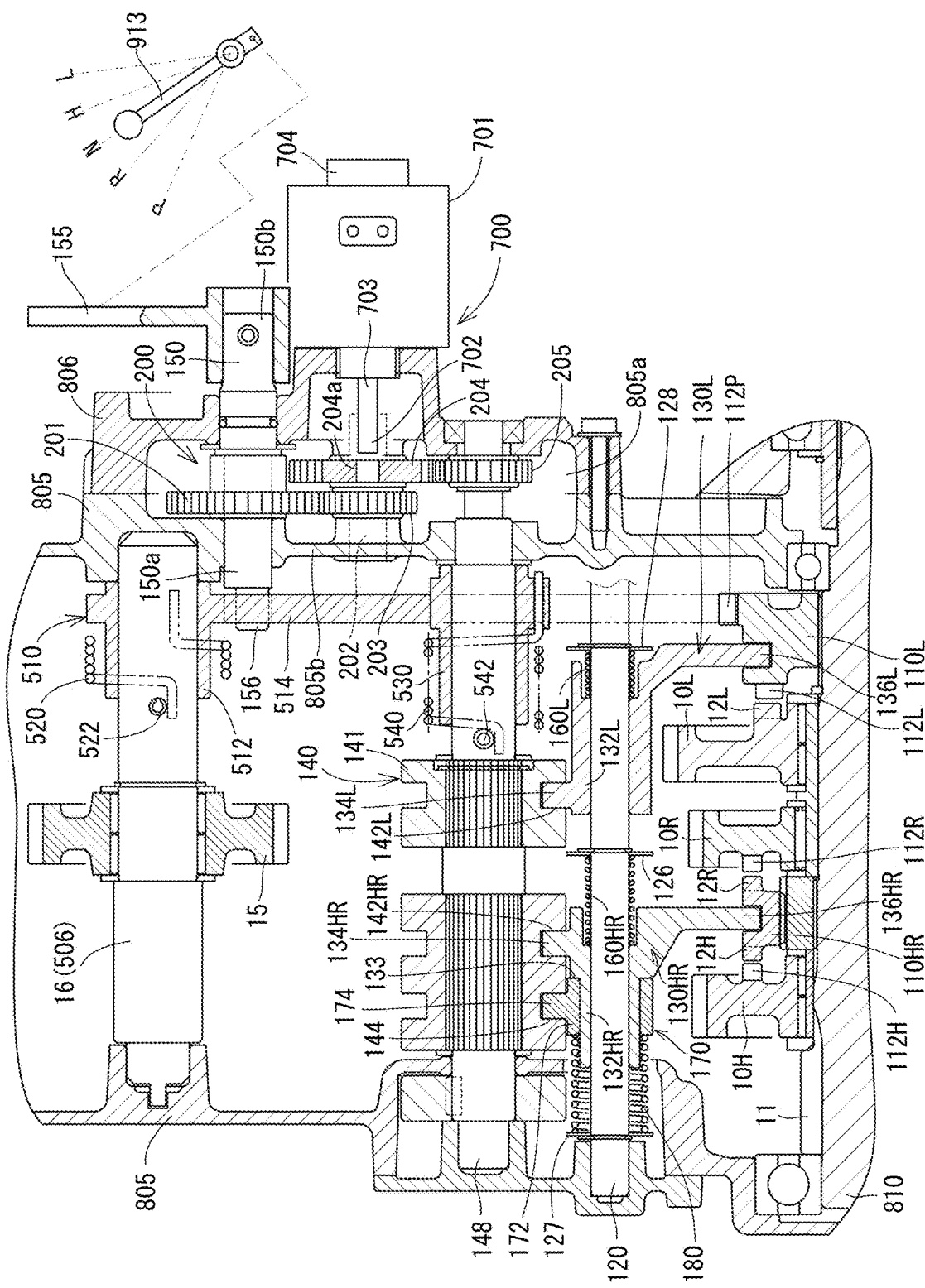
FIG. 11 is a schematic plan view of the same embodiment, which extends in the direction to which the axles of a reverse idle shaft, a fork shaft, a drum member, and a transmission operation shaft are parallel.

As depicted by FIG. 11, the transmission operation arm 155 which controls the rotation angle of the transmission operation shaft 150, is configured to be interlocked with the shift lever 913 that is provided in the vicinity of the seat in the vehicle.

Figure 12:
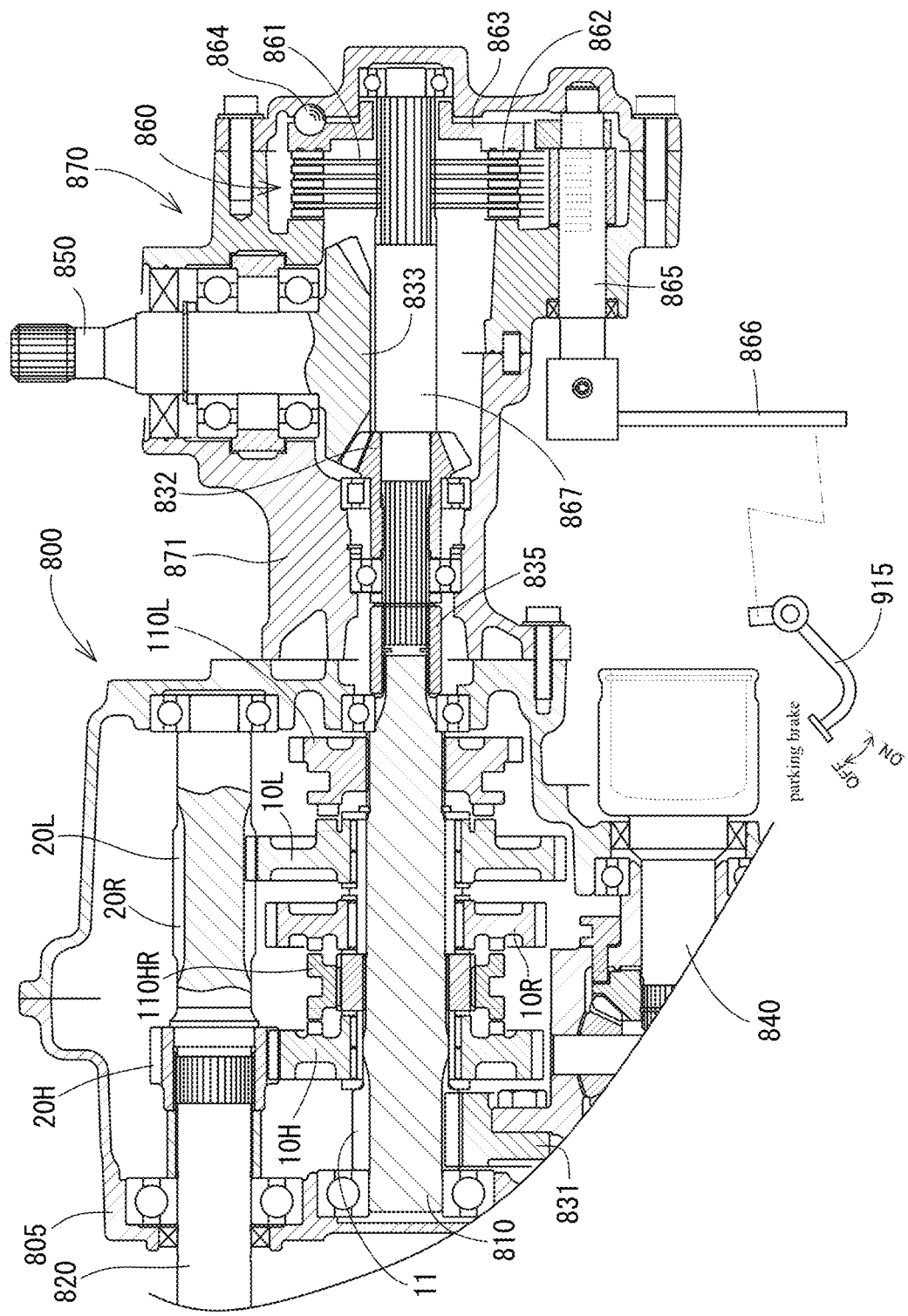
FIG. 12 is a schematic plan view illustrative of a variant of the parking brake.

FIG. 12 is a schematic plan view illustrative of a variant of the parking brake. In the present embodiment, the parking brake mechanism 860 is provided above a parking brake shaft 867 that is connected to the transmission shaft 810 and the drive bevel gear 832 in a relatively non-rotatable manner.

When the parking brake operation tool 915 is at an on-position, the parking brake mechanism 860 functions in the way that, by pressing the mating plate 862 toward the friction plate 861 fixed to the parking brake shaft 867, the rotation of the parking brake shaft 867 will subsequently be braked, to which the drive bevel gear 832 and the transmission shaft 810 that are connected in a relatively non-rotatable manner will therefore be braked. On the other hand, when the parking brake operation tool 915 is at an off-position, the parking brake mechanism 860 allows the rotation of the parking brake shaft 867, the drive bevel gear 832 and the transmission shaft 810 with the mating plate 862 being positioned away from the friction plate 861.

The configuration of the parking brake mechanism 860 is not limited to the above-mentioned embodiments. For instance, the parking brake operation shaft 865 may also be rotated around the axis by an electric motor. In this case, the parking brake operation arm 866 is removed, and the output shaft of the electric motor (not shown) is connected to the parking brake operation shaft 865. In this case, it is preferable to provide an angle sensor (not shown) for detecting the position of the parking brake operation shaft 865 around the axis.

The parking brake operation tool 915 may be a pedal or a lever. The parking brake operation shaft 865 may alternatively be a button switch for the configuration in which the parking brake operation shaft 865 is rotated by an electric motor.

Moreover, in the vehicle which is provided with the transmission 800, it may also be alternatively configured such that the transmission 800 of the axle drive device (rear axle drive device 5) drives the front wheels 6 and the power take-out device 870 drives the rear wheels 4.

The present invention is not limited to the above-described embodiments, but can be realized in various forms. The configuration of each part is not limited to the illustrated embodiment, and various modifications can be made without departing from the spirit and scope of the present invention.

REFERENCE SIGNS LIST 1 drum-type transmission device
4 rear wheel
5 rear axle drive device
6 front wheel
10, 10H, 10L, 10R shift gears
100 drum-type shift operation mechanism
110L second shifter member (an example of parking gear)
112P parking concave/convex portion
140 drum member
150 transmission operation shaft
155 shifting operation arm
200 shift gear train
201 shift drive gear (shift gear)
203 first shift idle gear (shift gear)
204 second shift idle gear (shift gear)
204a lock member engagement portion
204b lock member engagement portion
205 shift gear
500, 500A parking lock mechanism
510 parking operation arm
530 parking pushing member
860 parking brake mechanism
870 power take-out device
H high-speed position (shift position)
L low-speed position (shift position)
N neutral position
P parking position
R reverse position (shift position)

What is claimed is:

1. A drum transmission device, which comprises
a transmission shaft, which is configured to drive a vehicle wheel,
a drum member, which is configured to perform a shift operation,
a transmission operation shaft, which is configured to rotate the drum member, and
a parking lock mechanism;
wherein the parking lock mechanism comprises
a parking gear which is configured to be provided on the transmission shaft so as to be relatively non-rotatable,
a parking operation arm which is configured to be displaceable between a lock position at which the parking operation arm engages with the parking gear and an unlock position at which the parking operation arm separates from the parking gear,
a parking release spring which is configured to urge the parking operation arm toward the unlock position, and
a parking pushing member which is configured to push the parking operation arm according to the rotation of the drum member from a shift position or a neutral position to a parking position;
wherein one end of the transmission operation shaft is located near the parking operation arm; at the one end of the transmission operation shaft, there is provided an arm restraining portion which is capable of urging the parking operation arm toward the unlock position when the drum member rotates from the parking position to the shift position or the neutral position.

2. The drum transmission device according to claim 1, wherein
the arm restraining portion is formed by cutting out the one end of the transmission operation shaft, and is eccentric with respect to an axis of the transmission operation shaft;
a portion of the parking operation arm facing the arm restraining portion overlaps with a part of a cutout portion of the transmission operation shaft when viewed from the axial direction of the transmission operation shaft at the lock position,
whereas the portion of the parking operation arm facing the arm restraining portion is shaped so as not to hinder the displacement of the arm restraining portion accompanying the rotation of the transmission operation shaft at the unlock position.

3. The drum transmission device according to claim 1, further comprising
a transmission operation arm, which is configured to rotate the drum member via a shift gear train, and
a parking lock holding mechanism, which is configured to engage a gear lock member with a lock member engagement portion which is provided to one of the plurality of shift gears constituting the shift gear train so as to inhibit the rotation of the shift gear, when the drum member is at the parking position.

4. The drum transmission device according to claim 3, wherein
the parking lock holding mechanism comprises an electric actuator which is configured to slide the gear lock member in a direction in which the gear lock member is disengaged from the lock member engagement portion;
the parking lock holding mechanism is configured to urge the gear lock member in a direction in which the gear lock member engages with the lock member engagement portion, at the time when the electric actuator is de-energized.

5. The drum transmission device according to claim 4, wherein
the electric actuator comprises a solenoid which is configured to have a plunger that makes linear movement;
wherein the gear lock member is provided at a distal end of the plunger.

6. A vehicle, which comprises
a drive source, which is configured to be supported by a vehicle body,
front wheels and rear wheels, which are configured to be supported by the vehicle body, and
a transmission, which is configured to transmit the power of from the drive source to the front and rear wheels;
wherein the transmission comprises
the drum transmission device according to claim 1,
an axle drive device, which is configured to drive the front wheels or the rear wheels, and
a power take-off device, which is configured to drive the front wheels or the rear wheels;
wherein the power take-off device comprises a parking brake mechanism, which is configured to selectively brake the rotation of the transmission shaft of the drum transmission device.

7. A drum transmission device, which comprises
a transmission shaft, which is configured to drive a vehicle wheel,
a drum member, which is configured to perform a shift operation,
a transmission operation shaft, which is configured to rotate the drum member, and
a parking lock mechanism;
wherein the parking lock mechanism comprises
a parking gear which is configured to be provided on the transmission shaft so as to be relatively non-rotatable,
a parking operation arm which is configured to be displaceable between a lock position at which the parking operation arm engages with the parking gear and an unlock position at which the parking operation arm separates from the parking gear,
a parking release spring which is configured to urge the parking operation arm toward the unlock position, and
a parking pushing member which is configured to push the parking operation arm according to the rotation of the drum member from a shift position or a neutral position to a parking position;
wherein one end of the transmission operation shaft is located near the parking operation arm; at the one end of the transmission operation shaft, there is provided an arm restraining portion which is configured to restrict the movement of the parking operation arm toward the unlock position when the drum member is at the parking position.

8. The drum transmission device according to claim 7, wherein
the arm restraining portion is formed by cutting out the one end of the transmission operation shaft, and is eccentric with respect to an axis of the transmission operation shaft;
a portion of the parking operation arm facing the arm restraining portion overlaps with a part of a cutout portion of the transmission operation shaft when viewed from the axial direction of the transmission operation shaft at the lock position,
whereas the portion of the parking operation arm facing the arm restraining portion is shaped so as not to hinder the displacement of the arm restraining portion accompanying the rotation of the transmission operation shaft at the unlock position.

9. The drum transmission device according to claim 7, further comprising
a transmission operation arm, which is configured to rotate the drum member via a shift gear train, and
a parking lock holding mechanism, which is configured to engage a gear lock member with a lock member engagement portion which is provided to one of the plurality of shift gears constituting the shift gear train so as to inhibit the rotation of the shift gear, when the drum member is at the parking position.

10. The drum transmission device according to claim 9, wherein
the parking lock holding mechanism comprises an electric actuator which is configured to slide the gear lock member in a direction in which the gear lock member is disengaged from the lock member engagement portion;
the parking lock holding mechanism is configured to urge the gear lock member in a direction in which the gear lock member engages with the lock member engagement portion, at the time when the electric actuator is de-energized.

11. The drum transmission device according to claim 10, wherein
- the electric actuator comprises a solenoid which is configured to have a plunger that makes linear movement;
- wherein the gear lock member is provided at a distal end of the plunger.

12. A vehicle, which comprises
- a drive source, which is configured to be supported by a vehicle body,
- front wheels and rear wheels, which are configured to be supported by the vehicle body, and
- a transmission, which is configured to transmit the power of from the drive source to the front and rear wheels;
- wherein the transmission comprises
- the drum transmission device according to claim 7,
- an axle drive device, which is configured to drive the front wheels or the rear wheels, and
- a power take-off device, which is configured to drive the front wheels or the rear wheels;
- wherein the power take-off device comprises a parking brake mechanism, which is configured to selectively brake the rotation of the transmission shaft of the drum transmission device.

* * * * *